(12) United States Patent
Thomas et al.

(10) Patent No.: US 10,105,656 B2
(45) Date of Patent: Oct. 23, 2018

(54) ELECTROSPUN CACTUS MUCILAGE NANOFIBERS

(71) Applicants: Sylvia W. Thomas, Orlando, FL (US); Norma A. Alcantar, Tampa, FL (US); Yanay Pais, Tampa, FL (US)

(72) Inventors: Sylvia W. Thomas, Orlando, FL (US); Norma A. Alcantar, Tampa, FL (US); Yanay Pais, Tampa, FL (US)

(73) Assignee: University of South Florida, Tampa, FL (US)

( * ) Notice: Subject to any disclaimer, the term of this patent is extended or adjusted under 35 U.S.C. 154(b) by 115 days.

(21) Appl. No.: 15/383,794

(22) Filed: Dec. 19, 2016

(65) Prior Publication Data

US 2017/0157571 A1 Jun. 8, 2017

Related U.S. Application Data

(62) Division of application No. 13/532,189, filed on Jun. 25, 2012, now Pat. No. 9,555,392.

(Continued)

(51) Int. Cl.
 *C02F 1/28* (2006.01)
 *B01J 20/24* (2006.01)
(Continued)

(52) U.S. Cl.
 CPC .......... *B01D 69/144* (2013.01); *B01D 53/02* (2013.01); *B01D 67/0004* (2013.01); *B01D 69/02* (2013.01); *B01D 71/08* (2013.01); *B01D 71/38* (2013.01); *B01D 71/52* (2013.01); *B01J 20/24* (2013.01); *B01J 20/26* (2013.01); *B01J 20/261* (2013.01); *B01J 20/28007* (2013.01);

(Continued)

(58) Field of Classification Search
 CPC .... B01D 2323/39; B01D 39/14; B01D 39/16; B01D 39/1607; B01D 39/1615; B01D 39/02; B01D 71/06; B01D 71/08; B01D 71/38; B01D 71/52; B01D 2253/20; B01D 2253/202; B01D 2253/304; B01D 2253/306; B01D 2253/308; B01D 2253/211; B01D 2253/34; B01D 2258/06; B01D 53/02; B01D 67/0004; B01D 69/02; B01D 69/144; B01J 20/24; B01J 20/26; B01J 20/261; B01J 20/28007; B01J 20/28023; B01J 20/28038; B01J 2220/44; B01J 2220/4825; C02F 1/286; C02F 1/442; C02F 2305/08
 See application file for complete search history.

(56) References Cited

U.S. PATENT DOCUMENTS 5,000,857 A 3/1991 Kunkel

OTHER PUBLICATIONS

Nicoll, Harold, Nanofiltration Membranes: Water Needs, Unique Research Arrangement Lead to Membrane Development, Water Quality Products, Jan. 2001, 6:14.

(Continued)

*Primary Examiner* — Pranav N Patel
(74) *Attorney, Agent, or Firm* — Saliwanchik, Lloyd & Eisenschenk

(57) ABSTRACT

Novel electrospun nanofibers and nanofibrous membranes, methods of manufacturing the same, and methods of using the same are provided. The nanofibers include a cactus mucilage, such as mucilage from *Opuntia ficus-indica*. An organic polymer can be added to the cactus mucilage before electrospinning. The nanofibrous membranes can be used in water filtration.

20 Claims, 19 Drawing Sheets

Related U.S. Application Data

(60) Provisional application No. 61/501,010, filed on Jun. 24, 2011.

(51) Int. Cl.

| | |
|---|---|
| B01J 20/26 | (2006.01) |
| B01D 71/06 | (2006.01) |
| B01D 69/14 | (2006.01) |
| B01J 20/28 | (2006.01) |
| B29C 47/00 | (2006.01) |
| C02F 1/44 | (2006.01) |
| B01D 67/00 | (2006.01) |
| B01D 69/02 | (2006.01) |
| B01D 71/08 | (2006.01) |
| B01D 71/38 | (2006.01) |
| B01D 71/52 | (2006.01) |
| B01D 53/02 | (2006.01) |
| B82Y 30/00 | (2011.01) |
| D01D 1/02 | (2006.01) |
| D01D 5/00 | (2006.01) |
| D01F 6/14 | (2006.01) |
| B82Y 40/00 | (2011.01) |

(52) U.S. Cl.
CPC ... *B01J 20/28023* (2013.01); *B01J 20/28038* (2013.01); *B29C 47/0004* (2013.01); *B29C 47/0014* (2013.01); *B82Y 30/00* (2013.01); *C02F 1/286* (2013.01); *C02F 1/442* (2013.01); *D01D 1/02* (2013.01); *D01D 5/003* (2013.01); *D01D 5/0092* (2013.01); *D01F 6/14* (2013.01); *B01D 2253/20* (2013.01); *B01D 2253/202* (2013.01); *B01D 2253/304* (2013.01); *B01D 2253/306* (2013.01); *B01D 2253/308* (2013.01); *B01D 2253/311* (2013.01); *B01D 2253/34* (2013.01); *B01D 2258/06* (2013.01); *B01D 2323/39* (2013.01); *B01J 2220/44* (2013.01); *B01J 2220/4825* (2013.01); *B82Y 40/00* (2013.01); *C02F 2305/08* (2013.01); *D10B 2505/04* (2013.01); *Y10S 57/00* (2013.01)

(56) References Cited

OTHER PUBLICATIONS

Prüss-Üstün, *Safer Water, Better Health: Costs, Benefits and Sustainability of Interventions to Protect and Promote Health*, World Health Organization, Geneva, 2008.
Savage, "Nanomaterials and Water Purification: Opportunities and Challenges", *Journal of Nanoparticle Research*, vol. 7, pp. 331-342, Springer, 2005.
Apec Water, "Different Water Filtration Methods Explained," http://www.freedrinkingwater.com/water-education/quality-water-filtration-method.htm, Oct. 30, 2015.
Young, "The Mucilage of Opuntia Ficus Indica: A Natural, Sustainable, and Viable Water Treatment Technology for Use in Rural Mexico for Reducing Turbidity and Arsenic Contamination in Drinking Water," Graduate Theses and Dissertations, University of South Florida, 2006.
Gopal, "Electrospun Nanofibrous Filtration Membrane," *Journal of Membrane Science*, vol. 281, pp. 581-586, Apr. 2006.
Van Der Bruggen, "Removal of pollutants from surface water and groundwater by nanofiltration: overview of possible applications in the drinking water industry," *Environmental Pollution*, vol. 122, pp. 435-445, Elsevier Science, Ltd., 2003.
"The Past, Present, and Future of Water Filtration Technology," HistoryofWaterFilters.com, 2004.
Boussu, "Characterization of Commercial Nanofiltration Membranes and Comparison With Self-Made Polyethersulfone Membranes," *Desalination*, vol. 191, pp. 245-253, Elsevier B.V, 2006.
Lee, "Antioxidant Property of an Ethanol Extract of the Stem of *Opuntia ficus-indica* var. *Saboten*", *Journal of Agricultural and Food Chemistry*, vol. 50, pp. 6490-6496, 2002.
Kiesling, "Origen, Domesticación y Distribución de *Opuntia ficus-indica,*" *America*, vol. 22, pp. 4747-4748, 1995.
Jani, "Gums and Mucilages: Versatile Excipients for Pharmaceutical Formulations," *Asian Journal of Pharmaceutical Sciences*, vol. 4, pp. 309-323, 2009.
Cárdenas, "Rheology and Aggregation of Cactus (*Opuntia ficus-indica*) Mucilage in Solution," pp. 152-159, 1997.
Saenz, "Opuntia spp mucilages: a Functional Component With Industrial Perspectives," *Journal of Arid Environments*, vol. 57, pp. 275-290, Elsevier, Ltd., 2003.
Buttice, "Reducing Sediment and Bacterial Contamination in Water Using Mucilage Extracted from the *Opuntia ficus-indica* cactus," University of South Florida, Graduate Theses and Dissertations, 2009.
Huang, "A Review on Polymer Nanofibers by Electrospinning and Their Applications in Nanocomposites," *Composites Science and Technology*, vol. 63, pp. 2223-2253, Elsevier, Ltd., 2003.
Yan, "Alignment of Electrospun Nanofibers Using Dielectric Materials," *Applied Physics Letters*, vol. 95, p. 143114, 2009.
Zhang, "Preparation of Electrospun chitosan/poly(vinyl alcohol) Membranes," *Colloid and Polymer Science*, vol. 285, pp. 855-863, 2007.
Ziabari, "Application of Direct Tracking Method for Measuring Electrospun Nanofiber Diameter," *Brazilian Journal of Chemical Engineering*, vol. 26, pp. 53-62, Brazil, Mar. 2009.
Jia, "Fabrication and Characterization of Poly (vinyl alcohol)/Chitosan Blend Nanofibers Produced by Electrospinning Method," *Carbohydrate Polymers*, vol. 67, pp. 403-409, Elsevier, Ltd., 2006.
Buttafoco, "Electrospinning of Collagen and Elastin for Tissue Engineering Applications," *Biomaterials*, vol. 27, pp. 724-34, Elsevier, Ltd., 2005.
Ma, "Preparation and Characterization of Chitosan/Poly(Vinyl Alcohol)/Poly(Vinyl Pyrrolidone) Electrospun Fibers," *Frontiers of Materials Science in China*, vol. 1, pp. 432-436, China, 2007.
Frenot, "Electrospinning of Cellulose-Based Nanofibers," *Polymer*, Wiley Periodicals, Inc. 2006.
Qi, "Electrospinning of Cellulose-Based Fibers From NaOH/Urea Aqueous System," *Macromolecular Materials and Engineering*, vol. 295, pp. 695-700, Wiley-VCH Verlag GmbH &Co., 2010.
Manandhar, "Water Soluble Levan Polysaccharide Biopolymer Electrospun Fibers," *Carbohydrate Polymers*, vol. 78, pp. 794-798, Elsevier, Ltd., 2009.
Buttice, "Removal of Sediment and Bacteria from Water Using Green Chemistry," *Environmental Science & Technology*, vol. 44, pp. 3514-3519, 2010.
Zuwei Ma, M. Kotaki, S. Ramakrishna, Electrospun cellulose nanofiber as affinity membrane, Journal of Membrane Science, vol. 265, Issues 1-2, Nov. 15, 2005, pp. 115-123.
Mohamed E Malainine, Alain Dufresne, Daniéle Dupeyre, Mostafa Mahrouz, Roger Vuong, Michel R Vignon, Structure and morphology of cladodes and spines of Opuntia ficus-indica. Cellulose extraction and characterization, Carbohydrate Polymers, vol. 51, Issue 1, Jan. 1, 2003, pp. 77-83.
Mane P.C, Bhosle A. B, Jangam C. M and Mukate S. V., Heavy Metal Removal from Aqueous Solution by Opuntia: A Natural Polyelectrolyte, Journal of Natural Product and Plant Resources, 2011: vol. One: Issue 1, p. 75-80.
Sarah M. Miller, Ezekiel J Fugate, Vinka Oyanedel Craver, James A. Smith, Julie B. Zimmerman; Toward Understanding the Efficacy and Mechanism of Opuntia spp. as a Natural Coagulant for Potential Application in Water Treatment; Environmental Science Technology, 2008, vol. 42, pp. 4274-4279.
Istvan Siro, David Plackett; Microfibrillated cellulose and new nanocomposite material: a review; Cellulose, 2010 vol. 17, pp. 459-494.

(56) References Cited

OTHER PUBLICATIONS

Yanay Pais; Fabrication and Characterization of Electrospun Cactus Mucilage Nanofibers, Jan. 1, 2011, Graduate School Theses and Dissertation, University of South Florida, pp. 1-46.
Bin Ding, Eiji Kimura, Tomokazu Sato, Shiro Fujita, Seimei Shiratori; Fabrication of blend biodegradable nanofibrous nonwoven mats via multi-jet electrospinning; Jan. 17, 2004, Polymer, vol. 45, Issue 6, pp. 1895-1902.
Office Action dated Jul. 12, 2013 in U.S. Appl. No. 13/532,189.
Maria S. Peresin, Youssef Habibi, Justin O. Zoppe, Joel J. Pawlak, and Orlando J. Rojas; Nanofiber Composites of Polyvinyl Alcohol and Cellulose Nanocrystals: Manufacture and Characterization, Biomacromolecules 2010, 11, 674-681.
Wenshuai Chen, Haipeng Yu, Yixing Liu, Peng Chen, Mingxin Zhang, Yufei Hai, Individualization of cellulose nanofibers from wood using high-intensity ultrazonication combined with chemical pretreatments, Carbohydrate Polymers 83 (2011) 1804-1811.
Youssef Habibi, Lucian A. Lucia, and Orlando J. Rojas, Cellulose Nanocrystals: Chemistry, Self-Assembly, and Applications, Chemical Review 2010, 110, 3479-3500.
Georgios Toskas, Rolf-Dieter Hund, Ezzedine Laourine, Chokri Cherif, Vangelis Smyrniotopoulous, Vassilios Roussis, Nanofibers based on polysaccharides from the green seaweed Ulva Rigida, Carbohydrate Polymers 84 (2011) 1093-1102.
Shweta A. Paralikar, John Simonsen, John Lombardi, Poly(vinyl alcohol)/cellulose nanycrystal barrier membranes, Journal of Membrane Science 320 (2008) 248-258.
Christian Aulin, Mikael Gallstedt, Tom Lindstrom, Oxygen and oil barrier properties of microfibrillated cellulose films and coatings, Cellulose (2010) 17:559-574.
Office Action dated Apr. 29, 2015 in U.S. Appl. No. 13/532,189.

FIGS. 4A, 4B, and 4C

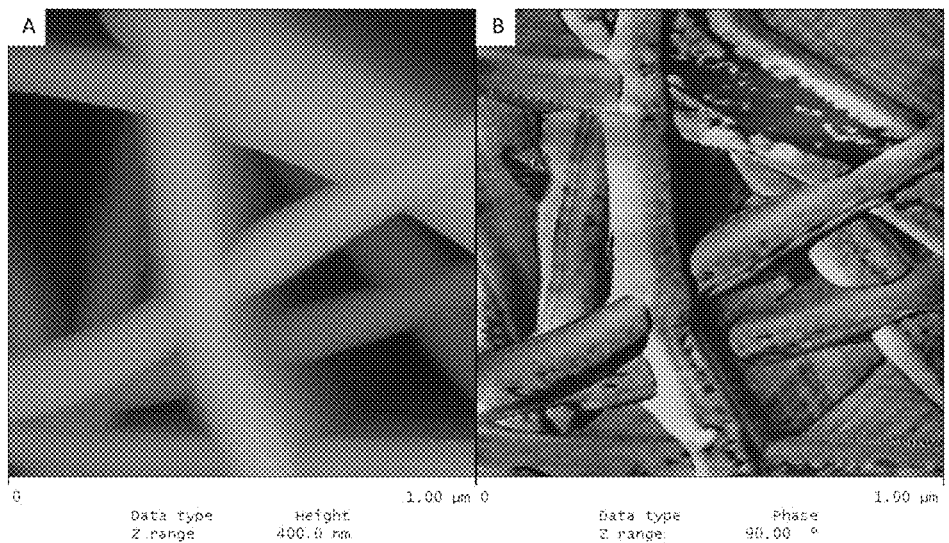
FIGS. 21A and 21B
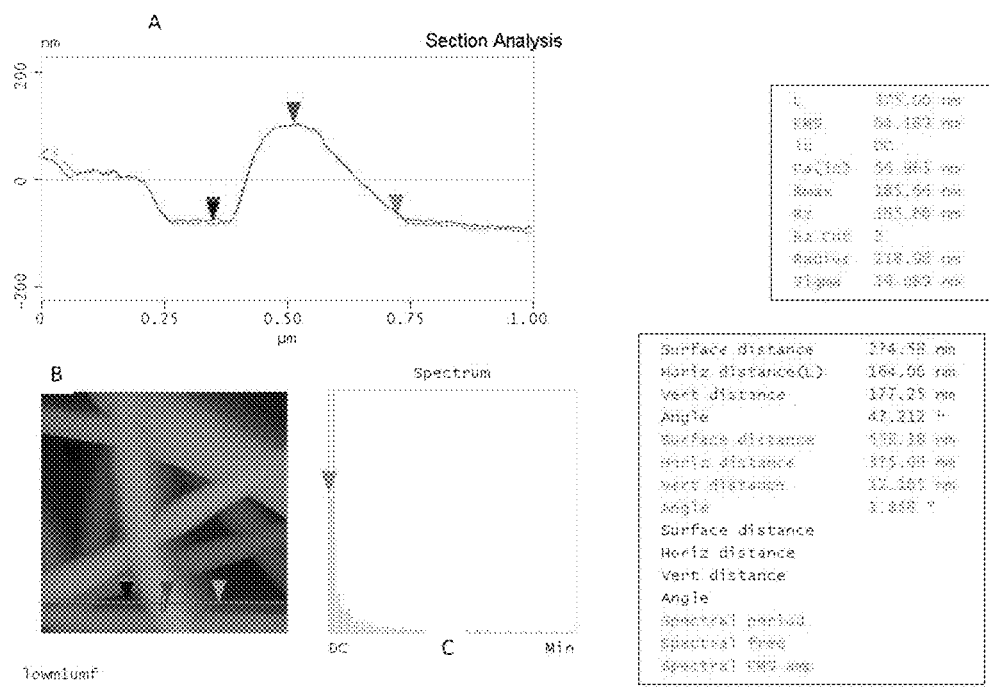
FIGS. 22A, 22B, and 22C

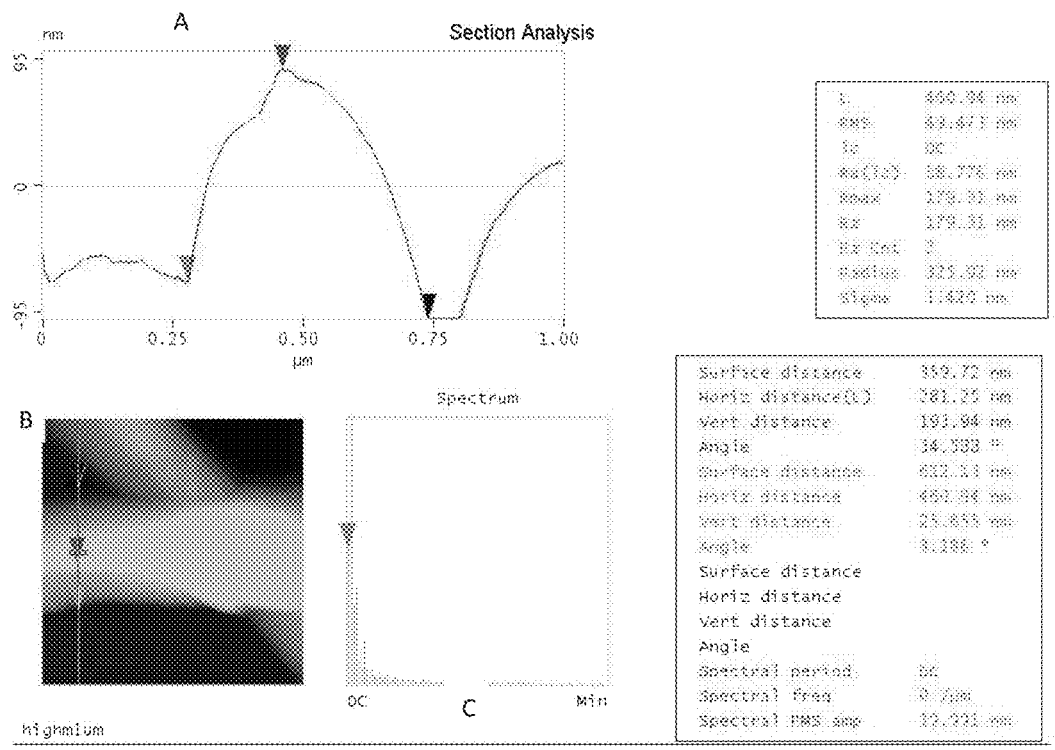
FIGS. 25A, 25B, and 25C
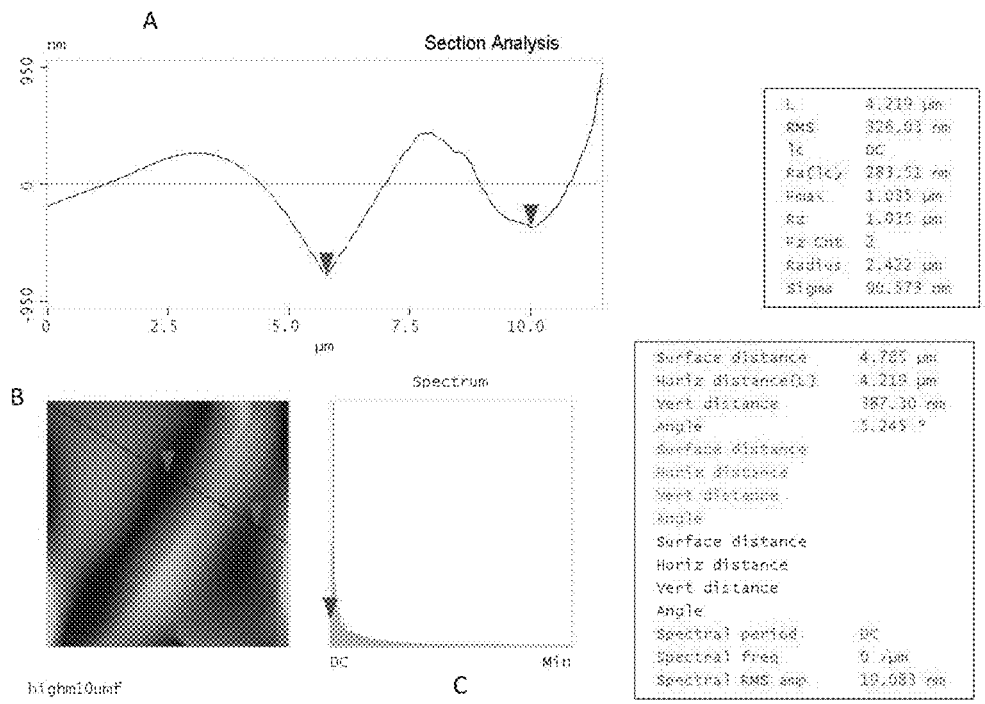
FIGS. 26A, 26B, and 26C

A                              B

ELECTROSPUN CACTUS MUCILAGE NANOFIBERS

CROSS-REFERENCE TO RELATED APPLICATIONS

This application is a divisional of U.S. application Ser. No. 13/532,189, filed Jun. 25, 2012, which claims the benefit of U.S. Provisional Application Ser. No. 61/501,010, filed Jun. 24, 2011, the disclosures of which are incorporated herein by reference in their entirety.

GOVERNMENT SUPPORT

This invention was made with government support under grant number 1057897 awarded by the National Science Foundation. The government has certain rights in the invention.

BACKGROUND OF THE INVENTION

Water is fundamental for life on earth, and clean water is a necessity for everyone. Access to clean water is necessary for continuity of a healthy life. Unfortunately, getting clean water is a hardship many people still face. Although access to potable water has improved in the last hundred years, communities in developing countries are still affected by unhygienic drinking water. About 1.1 billion people in developing countries struggle with the challenge of cleaning contaminated water in their communities [1]. Additionally, 1.4 million children die from diarrhea annually [1]. Many of these unfortunate deaths could be prevented by increasing access to safe drinking water, but the process of cleaning contaminated water is sometimes difficult and costly.

Water is also essential in industries such as electronics, pharmaceuticals, and food [2]. Contaminants in water can be chemical or biological, either naturally occurring in the environment or man-made. To help maintain global sustainability of human health and welfare, we must develop ways to filter and clean our existing water resources. Of particular interest is the filtration of environmental contaminants with inexpensive, non-toxic, natural materials.

Since ancient times, people have tried different methods of cleaning water. It has always been important to remove the smell, taste, turbidity, metals, and pathogens that can exist in water [3]. Some of the methods to reduce contamination in water include sedimentation, chemical treatment, and filtration.

Sedimentation is a method of waiting for the particles in water to settle to the bottom by means of gravity and then removing the clean supernatant water. While this method has been used for thousands of years and is inexpensive, it is incapable of removing small microbes and metals that remain in the water [3].

Chemical treatment is also used to kill off viruses and bacteria living in water. The chemicals most widely used are chlorine and iodine. While these chemicals are easy to come by, getting the exact dosage to disinfect can be difficult. In addition, these chemicals are poisonous and adding too much in drinking water can cause illnesses, organ damage, and even death [4].

Filtration is commonly used in conjunction with sedimentation and chemical treatments [3]. Water filtration by definition means to sift out the impurities found in water. The size of the filtering pore is important to determine the size of particles that can be separated. Traditionally, filters can be made of sand, gravel, and charcoal. Newer filtering methods are made from materials including ceramics and carbon. Many existing nanofiber meshes are made up of non-organic materials that are not biodegradable.

BRIEF SUMMARY OF THE INVENTION

Embodiments of the subject invention are drawn to novel electrospun nanofibers and methods of manufacturing the same. Embodiments are also drawn to methods of filtering contaminants from water using the novel electrospun nanofibers.

In an embodiment, an electrospun nanofiber can include a cactus mucilage. The cactus mucilage can be, for example, *Opuntia ficus-indica* (Ofi) mucilage. The electrospun nanofiber can also include an organic polymer.

In another embodiment, a nanofibrous membrane can include at least one electrospun nanofiber including a cactus mucilage. The cactus mucilage can be, for example, *Opuntia ficus-indica* (Ofi) mucilage.

In anther embodiment, a method of producing an electrospun nanofiber can include: forming an electrospinning solution comprising a cactus mucilage and an organic polymer; and electrospinning the electrospinning solution to form the electrospun nanofibril. Forming the electrospinning solution can include: dissolving the cactus mucilage in a first solvent to form a first solution; dissolving the organic polymer in a second solvent to form a second solution; and combining the second solution and the first solution to form the electrospinning solution.

In another embodiment, a method of filtering contaminants from a fluid can include: providing a nanofibrous membrane; and passing the fluid through the nanofibrous membrane, such that the nanofibrous membrane absorbs at least one contaminant from the fluid. The nanofibrous membrane can include at least one electrospun nanofiber comprising a cactus mucilage. The fluid can be, for example, water.

BRIEF DESCRIPTION OF THE DRAWINGS

The patent or application file contains at least one drawing executed in color. Copies of this patent or patent application publication with color drawings will be provided by the Patent Office upon request and payment of the necessary fee.

FIG. 4A shows no mucilage and no $CaCl_2$; FIG. 4B shows no mucilage and $CaCl_2$ present at 20 mM; and FIG. 4C shows mucilage (2 ppm) and $CaCl_2$ present at 20 mM.

FIGS. 21A and 21B show AFM images at 1 μm of electrospun nanofibers according to an embodiment of the present invention. The feedstock was 9% low M PVA and mucilage in a ratio of 70:30 (PVA:mucilage).

FIGS. 22A, 22B, and 22C show an AFM Sectional Analysis at 1 μm of electrospun nanofibers according to an embodiment of the present invention. The feedstock was 9% low M PVA and mucilage in a ratio of 70:30 (PVA:mucilage). The fiber diameter measured about 177 nm.

FIGS. 25A, 25B, and 25C show a Sectional Analysis at 1 μm of electrospun nanofibers according to an embodiment of the present invention. The feedstock was 9% high M PVA and mucilage in a ratio of 70:30 (PVA:mucilage). The fiber diameter measured about 460 nm.

FIGS. 26A, 26B, and 26C show a Sectional Analysis at 1 μm of electrospun nanofibers according to an embodiment of the present invention. The feedstock was 9% high M PVA and mucilage in a ratio of 70:30 (PVA:mucilage). The fiber diameter measured about 4 μm.

DETAILED DISCLOSURE OF THE INVENTION

Embodiments of the subject invention are drawn to novel electrospun nanofibers and methods of manufacturing the same. Embodiments are also drawn to methods of filtering contaminants from water using the novel electrospun nanofibers.

The term "about," as used herein before a measured value, refers to within measurement error of the value following the term "about," typically +/−5% of the value (for example, "about 750 nm" refers to 712.5 nm to 787.5 nm).

Figure 1:
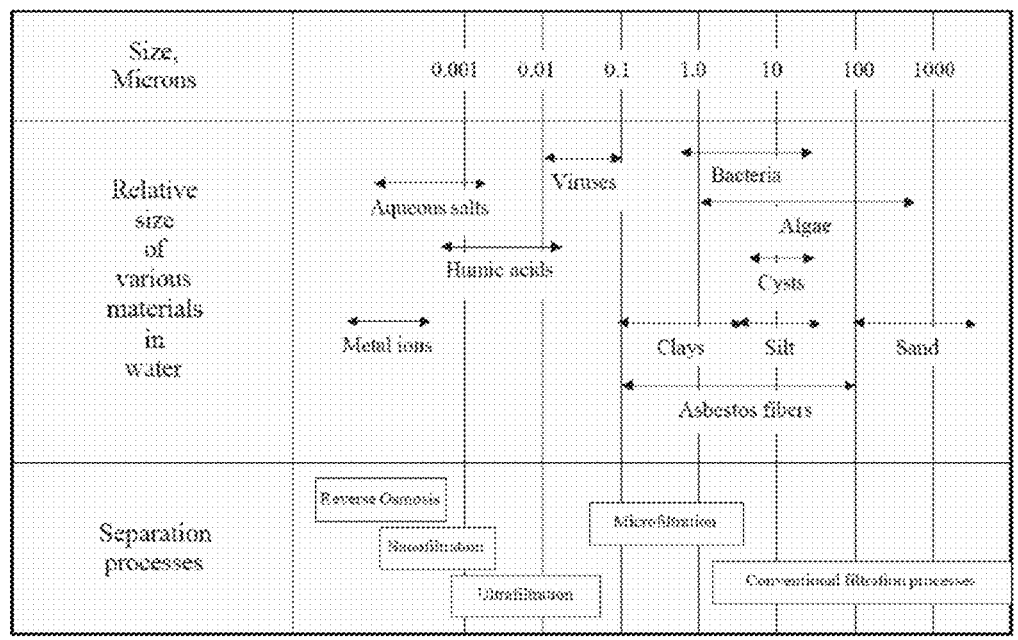
FIG. 1 shows a chart of filtration types versus size of common contaminants [5].

FIG. 1 shows types of filtering processes including conventional filtration, microfiltration, ultrafiltration, nanofiltration, and reverse osmosis, as well as the size of contaminants that can be filtered using each process.

For filtration processes, the size of the pores in the filters dictates the size of the materials that can be filtered out of the water. Nanofiltration and reverse osmosis are able to remove very small particles (e.g., 0.001 micron-sized), including pesticides, dyes, and other organic contaminants. Reverse osmosis is generally used in conjunction with carbon filtration for desalination processes, but reverse osmosis requires a large amount of energy to operate and water is lost in the process, along with dissolved naturally-occurring minerals that are needed for human nutrition.

Nanofiltration can be thought of as a combinatory process capable of removing hardness and a wide range of other components in one step. The small membranes used in nanofiltration have the advantages of compactness, low-cost operation, energy-efficiency, and high throughput. While most commercially available membranes are made with synthetic materials and are not biodegradable, nanofibrous membranes produced according to embodiments of the present invention can include only organic materials and can be biodegradable. Table 1 shows an overview of some existing nanofiltration membranes by manufacturer and composition.

TABLE 1

Overview of Commercial Nanofiltration Membranes

| | Membrane | | | | | |
|---|---|---|---|---|---|---|
| | UTC20 | Desal5DL | Desal51HL | NTR7450 | N30F | NFPES10 |
| Manufacturer | Toray[a] | GE Osmonics[b] | GE Osmonics[b] | Nitto-Denko[c] | Nadir[d] | Nadir[d] |
| MWCO (Dn) | 180 | 150-300 | 150-300 | 600-800 | 400 | 1000 |
| Max. temp (° C.) | 35 | 90 | 50 | 40 | 95 | 95 |
| pH range | 3-10 | 1-11 | 3-9 | 2-14 | 0-14 | 0-14 |
| Composition top layer | Polypiperazineamide | Cross-linked aromatic polyamide | Cross-linked aromatic polyamide | Sulfonated polyethersulfone | Permanently hydrophilic polyethersulfone | Permanently hydrophilic polyethersulfone |

[a]Tokyo, Japan;
[b]Le Mee sur Seine, Frankrijk;
[c]Somicon AG, Basel, Switzerland;
[d]Wiesbaden, Germany.

Filtration membranes are important components and highly utilized in water purification, waste treatment, and in clarification and concentration processes. Nanofiltration is an important method that can be used in industrial and public water purification systems. Synthesis of cost-effective and environmentally-acceptable functional materials, such as with embodiments of the present invention, can help provide low-cost, efficient, environmentally-acceptable water purification systems. The present invention provides environmentally friendly, non-toxic, and biodegradable methods of water treatment. It also provides sustainable technologies for water filtration that are economically competitive and affordable.

In an embodiment, an electrospun nanofiber can include a cactus mucilage. The cactus mucilage can be, for example, *Opuntia ficus-indica* (Ofi) mucilage. The electrospun nanofiber can also include an organic polymer.

In another embodiment, a nanofibrous membrane can include at least one electrospun nanofiber including a cactus mucilage. The cactus mucilage can be, for example, *Opuntia ficus-indica* (Ofi) mucilage.

In anther embodiment, a method of producing an electrospun nanofiber can include: forming an electrospinning solution comprising a cactus mucilage and an organic polymer; and electrospinning the electrospinning solution to form the electrospun nanofibril. Forming the electrospinning solution can include: dissolving the cactus mucilage in a first solvent to form a first solution; dissolving the organic polymer in a second solvent to form a second solution; and combining the second solution and the first solution to form the electrospinning solution.

In another embodiment, a method of filtering contaminants from a fluid can include: providing a nanofibrous membrane; and passing the fluid through the nanofibrous membrane, such that the nanofibrous membrane absorbs at least one contaminant from the fluid. The nanofibrous membrane can include at least one electrospun nanofiber comprising a cactus mucilage. The fluid can be, for example, water.

Figure 2:
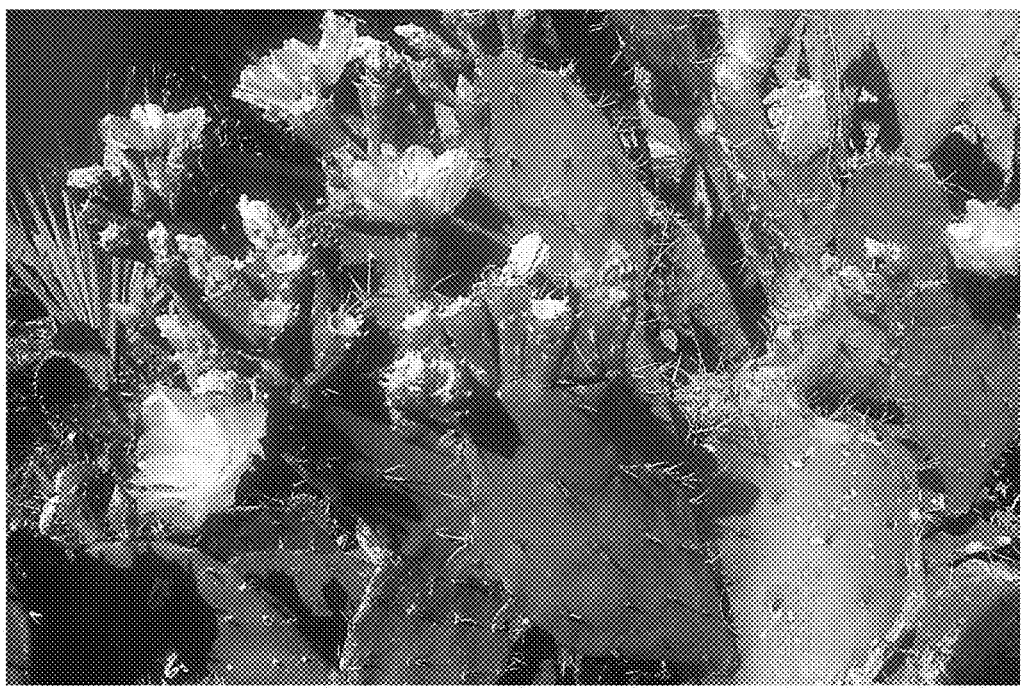
FIG. 2 shows naturally growing prickly pear cactus with flowers and fruit.
Figure 35:
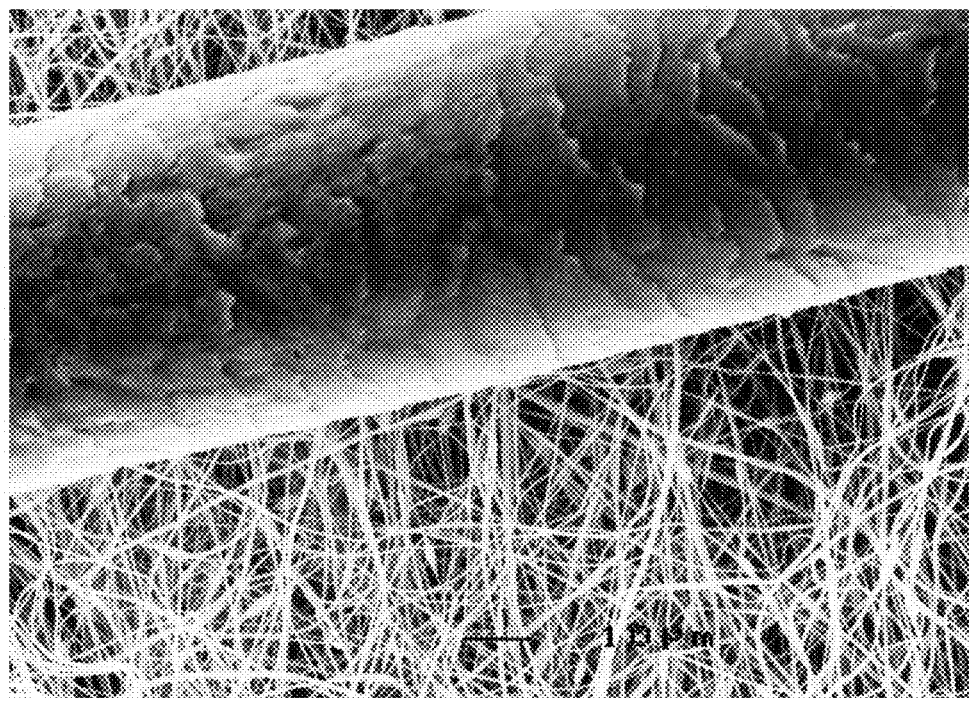
FIG. 35 shows an image of a human hair follicle overlaid on a mucilage nanofiber mesh.

In embodiments, cactus mucilage can be used as a component of a feedstock used to produce non-woven nanofibers. These non-woven nanofibers can be spun using an electrospinning technique. Electrospinning is a safe, simple, cost-effective, and reliable method of producing nanofiber meshes. FIG. 35 shows an image of a human hair follicle overlaid on a nanofiber mesh. Mucilage from any cactus can be used as a component of a feedstock used to electrospin nanofibers. For example, mucilage from the *Opuntia ficus-indica* (Ofi), also known as the prickly pear, can be used. Ofi is an abundant plant that can be found almost anywhere in the world. FIG. 2 shows a picture of naturally-growing Ofi with flowers and fruit. In certain embodiments, mucilage from aloe vera or okra can be used. In an embodiment, cactus goo can be used as a component of a feedstock used to produce an electrospun nanofiber.

The genus *Opuntia* is the largest under the Cactaceae family [11]. Domestication of Ofi started in Mexico about 9000 years ago [12]. After the colonization of the Americas, the Ofi plant was introduced to Spain and then the rest of the Mediterranean [12]. Varieties of *Opuntia* can now be found all around the world [11].

Ofi or prickly pear is a very versatile plant. Ofi leaves and fruits have been used in rural Mexico for their medicinal benefits, such as for treating atherosclerosis, diabetes, and gastritis and hyperglycemia [11]. Studies have been made to use the prickly pear for cultivation as an alternative to cereal and forage crops. The fruits of the cactus were to be used for human consumption and the green pads for livestock feeding [13]. The cactus has been also studied for its antioxidant properties.

The mucilage inside the Ofi plant is a thick, gummy, clear substance. Like mucilage from other plants, it aids in retaining and storing water for the cactus. Mucilage can swell when in contact with water, giving it the ability to precipitate ions and particles from aqueous solutions. Most of the mucilage is found in the cladodes or pads of the cactus. The mucilage content in the cladodes is influenced not only by the handling of the crop but is also dependent on the temperature and irrigation [13].

Mucilage is a neutral complex carbohydrate composed of 55 sugar residues including arabinose (67.3%), galactose (6.3%), rhamnose (5.4%), and xylose (20.4%), and a galacturonic acid [13, 14]. It also contains organic species which give the capacity to interact with metals, cations and biological substances such as K, Ca, Mg, Fe, Na, and others [13]. This unique surface activity enhances dispersion, creates emulsifications, and reduces tension of high polarity fluids.

Figure 3:
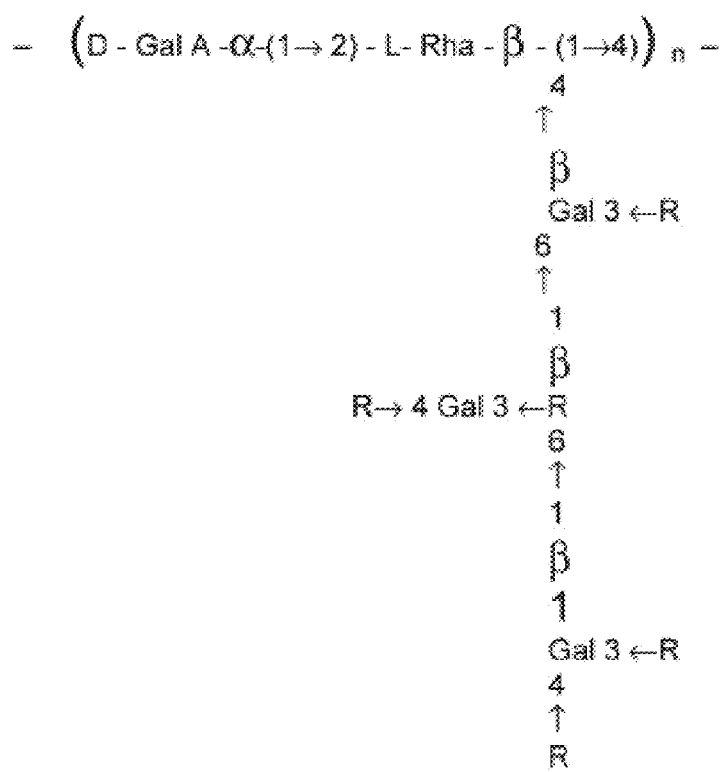
FIG. 3 shows the partial structure of *Opuntia ficus-indica* (Ofi) mucilage [13, 14].

FIG. 3 shows a partial structure of mucilage [13, 14]. R indicates the presence of different arabinose and xylose forms, D-Gal indicates D-galacturonic acid, Gal indicates galactose, and Rha indicates Rhamnose [13, 14, 5].

In embodiments of the subject invention, non-woven nanofibers can be produced by electrospinning. Electrospinning is a simple and inexpensive method of fabricating nanofibers from synthetic or natural polymers. In alternative embodiments, other methods can be used to produce nanofibers, including template synthesis and phase separation. Template synthesis uses a nanoporous membrane as a template to make nanofiber shapes, either hollow or solid. This method has the disadvantage of not being able to continuously create nanofibers. Phase separation nanofibers are created by dissolution, gelation, extraction with different solvents, freezing, and drying, resulting in nanoscale porous foam. This process has the disadvantage of taking a relatively long period of time to create the nanoscale porous foam [16].

Figure 5:
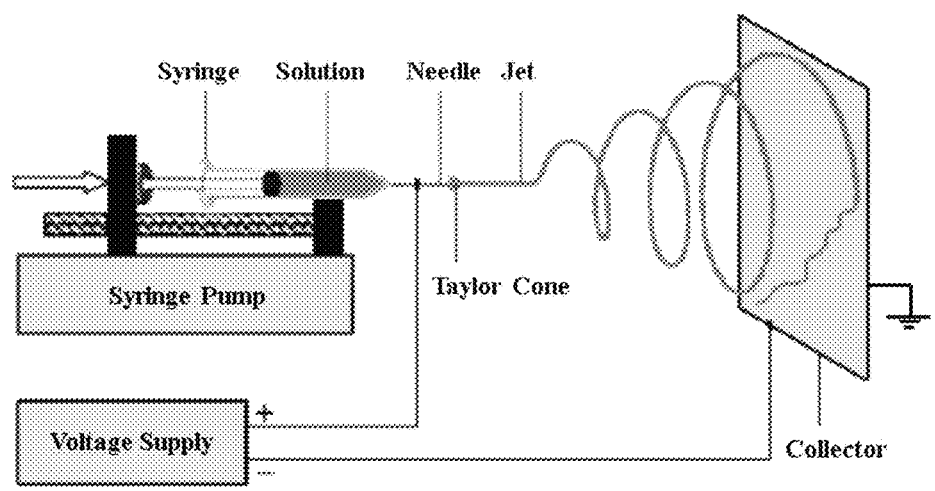
FIG. 5 shows a schematic of an electrospinning apparatus that can be used in a method of manufacturing electrospun nanofibers according to an embodiment of the present invention. A syringe pump is used for continuous feed of solution (adapted from [20]). The collector can be electrically conductive, and the voltage can be on the order of kilovolts (kV) or tens of kVs.

In embodiments of the subject invention, non-woven nanofibers can be produced by electrospinning. FIG. 5 shows a schematic of an electrospinning apparatus that can be used in methods of manufacturing electrospun nanofibers according to embodiments. A syringe pump can be used for continuous feed of solution over extended time periods. The collector is electrically conductive, and the voltage can be on the order of kilovolts (kV) or tens of kVs. The high voltage source can be used to create a charged jet of polymer solution out of the syringe. An electrode can be placed on the needle and the collector can grounded, driving a high voltage electric field between them. The charged polymers can evaporate and solidify into a network of tiny fibers that are collected on the collector.

In an embodiment, a polymer solution can be used as the feedstock for electrospinning. Solutions of one or more polymers can be mixed by dissolving one or more solid polymers with one or more appropriate solvents. Mixtures are different depending on the polymer, but once liquid is attained, it can be transferred to a syringe with needle. This dissolving process and the electrospinning can take place at any appropriate temperature and pressure conditions. In an embodiment, the dissolving process and electrospinning can take place at room temperature at atmospheric conditions.

During the electrospinning process, a syringe pump can be used to help push the polymer solution to the tip of the needle. A capillary can be formed and held at the end of the needle by surface tension. A DC voltage supply of, e.g., several kilovolts can be used to create an electric field between the needle tip and the collector. The electric field helps to induce a charge on the surface of the liquid and causes a force directly opposite to the surface tension directed towards the grounded collector plate. Increasing the electric field forces the hemispherical shape of the capillary into a cone shape, known as a Taylor cone. A critical value is attained in which the electric field force surpasses the surface tension, and the fluid is ejected from the Taylor cone tip. The polymer solution becomes unstable and elongates, allowing the jet to become very thin and long. The solvent(s) evaporate, leaving behind charged polymer fibers that solidify on the collector plate. In some instances, calcination of the fibers is required. The parameters of the electrospinning process can be varied to produce nanofibers with different properties.

In an embodiment, the voltage can be in a range of from 5 kV to 30 kV. In a further embodiment, the voltage can be in a range of from 20 kV to 22 kV. In a further embodiment, the voltage can be in a range of from about 20 kV to about 22 kV.

In an embodiment, the syringe inner diameter can be in a range of from 0.1 mm to 10 mm. In a further embodiment, the syringe inner diameter can be in a range of from 1 mm to 5 mm. In a further embodiment, the syringe inner diameter can be 4 mm or about 4 mm.

In an embodiment, the distance from the nozzle to the collector can be in a range of from 1 cm to 100 cm. In a further embodiment, the nozzle-collector distance can be in a range of from 5 cm to 15 cm. In a further embodiment, the nozzle-collector distance can be in a range of from 7 cm to 13 cm. In a further embodiment, the nozzle-collector distance can be in a range of from about 7 cm to about 13 cm.

In an embodiment, the electric field strength can be in a range of from about $10^2$ V/m to about $10^6$ V/m. In a further embodiment, the electric field strength can be in a range of from about $1.5 \times 10^5$ V/m to about $3.5 \times 10^5$ V/m. In a further embodiment, the electric field strength can be in a range of from about $1.53846 \times 10^5$ V/m to about $3.14285 \times 10^5$ V/m. In certain embodiments, the electric field strength can be $1.53846 \times 10^5$ V/m, $1.61538 \times 10^5$ V/m, $1.66666 \times 10^5$ V/m, $1.69230 \times 10^5$ V/m, $1.75000 \times 10^5$ V/m, $1.81818 \times 10^5$ V/m, $1.83333 \times 10^5$ V/m, $1.90909 \times 10^5$ V/m, $2 \times 10^5$ V/m, $2.1 \times 10^5$ V/m, $2.2 \times 10^5$ V/m, $2.22222 \times 10^5$ V/m, $2.33333 \times 10^5$ V/m, $2.44444 \times 10^5$ V/m, $2.5 \times 10^5$ V/m, $2.625 \times 10^5$ V/m, $2.75 \times 10^5$ V/m, $2.85714 \times 10^5$ V/m, $3 \times 10^5$ V/m, or $3.14285 \times 10^5$ V/m In an embodiment, the infusion rate of the prepared solution (e.g., feedstock solution) can be in a range of from 1 µL/min to 100 µL/min. In a further embodiment, the infusion rate of the feedstock solution can be in a range of from 1 µL/min to 10 µL/min. In a further embodiment, the infusion rate of the feedstock solution can be 2.5 µL/min or about 2.5 µL/min. The needle size can be, for example, 18-½" gauge or 22-1" gauge. The syringe size can be, for example, 1 mL.

Figure 6:
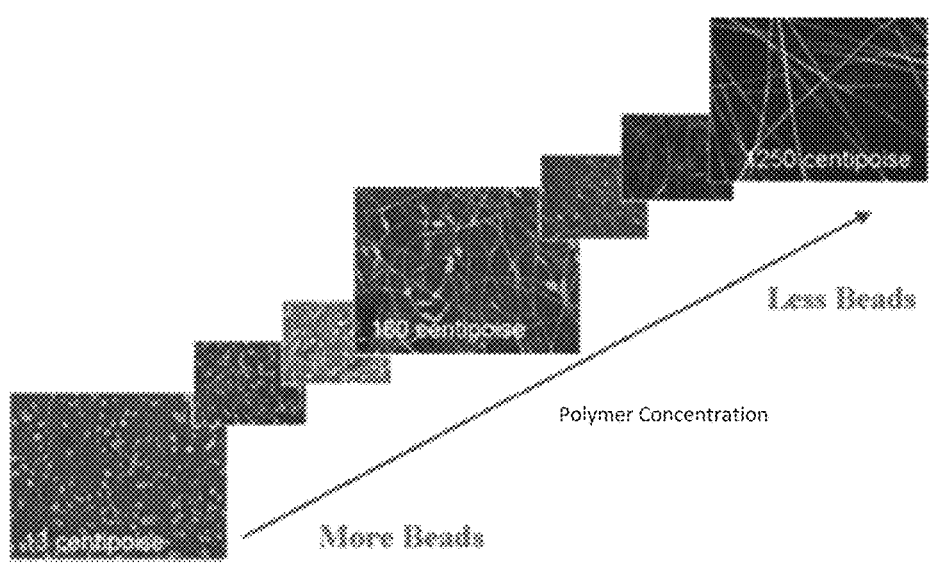
FIG. 6 shows SEM images of defects formed at lower levels of polymer concentration [16].

In embodiments, an electrospinning feedstock includes a co-spinning polymer added to cactus mucilage. The co-spinning polymer can help initiate forming the polymer chains needed for nanofiber formation. The co-spinning polymer can be any appropriate polymer used for electrospinning, for example, an organic polymer. Examples of organic polymers that can be used include, but are limited to, chitosan, polyethylene glycol (PEG), poly lactic acid (PLA), and polyvinyl alcohol (PVA). PVA is a water soluble polymer that is odorless, non-toxic, biodegradable, and biocompatible. It is also resistant to oil and solvents and has high tensile strength and flexibility. When spinning PVA as a co-spinning agent with carbohydrates it is important to monitor the concentration and ratios of carbohydrates to PVA. The percent concentration of the solution should be closely monitored to achieve lower-defect or defect-free fibers. If the polymer concentration is too low, many defects or no fibers may be formed. The viscosity of the solution is related to the number of polymer chains in the solution. FIG. 6 shows SEM images of defects formed at lower levels of polymer concentration (increasing concentration to the right—giving less beads).

In an embodiment, the cactus mucilage can be dissolved in a solvent. The cactus mucilage solution can then be combined with an organic polymer to form the feedstock for electrospinning. Any appropriate solvent can be used to dissolve the cactus mucilage, for example, acetic acid (AA) or an aqueous solution including AA. AA is a weak acid that can easily be diluted and still be harmless and biocompatible when mixed with mucilage (and with PVA).

In many embodiments, electrospun nanofibers according to the present invention can each have a diameter of less than a micron. In alternative embodiments, the fibers can have a diameter of more than a micron or about a micron. In an embodiment, the fibers can have a diameter in a range of from 10 nm to 20 µm. In a further embodiment, the fibers can have a diameter in a range of from 10 nm to 10 µm. In a further embodiment, the fibers can have a diameter in a range of from 50 nm to 8 µm. In certain embodiments, the fibers can have a diameter of 52 nm, about 52 nm, 177 nm, about 177 nm, 180 nm, about 180 nm, 4 µm, about 4 µm, 7.8 µm, or about 7.8 µm.

In an embodiment, the solution used for electrospinning can include a mucilage and an organic polymer. The mucilage and the organic polymer can be present in the solution in a ratio of, for example, 70:30 (polymer:mucilage). In an embodiment, the percentage of the organic polymer in the electrospinning solution can be a range of from 1% to 99%. In a further embodiment, the percentage of the organic polymer in the electrospinning solution can be a range of from 5% to 95%. In a further embodiment, the percentage of the organic polymer in the electrospinning solution can be a range of from 10% to 95%. In a further embodiment, the percentage of the organic polymer in the electrospinning solution can be a range of from 30% to 95%. In a further embodiment, the percentage of the organic polymer in the electrospinning solution can be a range of from 50% to 95%. In a further embodiment, the percentage of the organic polymer in the electrospinning solution can be a range of from 70% to 95%. In a further embodiment, the percentage of the organic polymer in the electrospinning solution can be a range of from 50% to 90%.

In an embodiment, the solution used for electrospinning can include a mucilage and an organic polymer. An organic polymer solution can be combined with a solution including the mucilage to form the electrospinning solution. The organic polymer solution can include the organic polymer in a percentage of, for example, 7%, 9%, 11%, or 20%. In an embodiment, the organic polymer solution can include the polymer in a percentage of from 7% to 50%. In a further embodiment, the organic polymer solution can include the polymer in a percentage of from 9% to 20%. In a further embodiment, the organic polymer solution can include the polymer in a percentage of from 9% to 15%.

Figure 7:
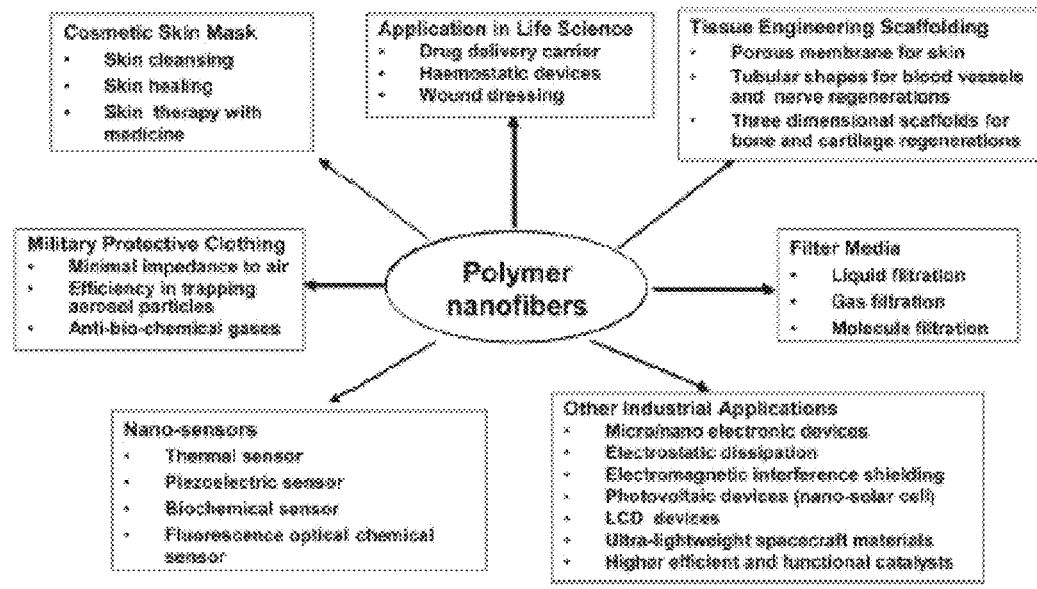
FIG. 7 shows a chart of applications for electrospun nanofibers made according to embodiments of the present invention [16].

Electrospun nanofibers are advantageous because of their small diameter, large surface area per unit mass, extremely small pore size, and superior mechanical properties. These features make them an ideal material for many applications. The mucilage nanofibers according to embodiments of the present invention have many advantageous uses, including but not limited to: water filtration; air and gas filtration; absorption; sensors; tissue scaffolding; tissue engineering; drug delivery; catalysts; enzyme carriers; food additives; textiles; and MEMS devices. FIG. 7 shows a chart of several uses for nanofibers of the present invention. Water filtration systems using nanofibrous membranes including mucilage nanofibers of the present invention can advantageously be affordable, biodegradable, sustainable, and can be utilized worldwide to help millions.

Figure 4:
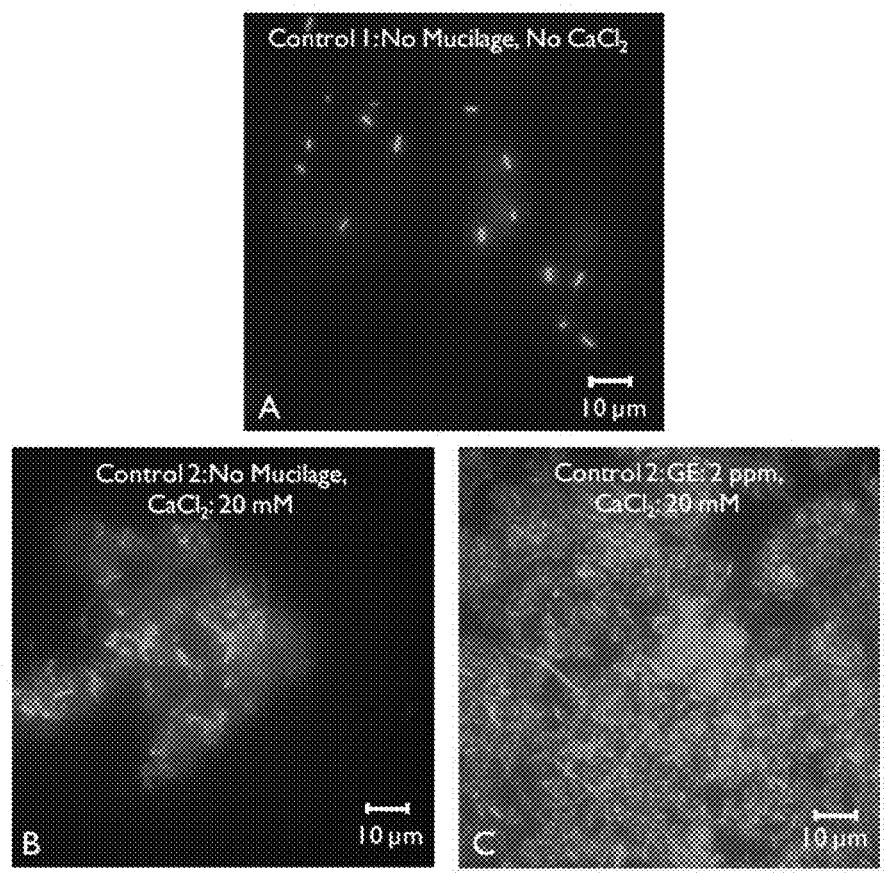
FIGS. 4A, 4B, and 4C show microscopic fluorescent images of *E. coli* with and without mucilage [27, 28].

Ofi mucilage is a versatile and unique substance. Nanofiber meshes produced from this mucilage can be used for biodegradable water filters. Ofi mucilage can advantageously remove bacteria from water. FIGS. 4A-4C show microscopic fluorescent images of *E. coli* with and without mucilage. FIG. 4A shows no mucilage and no $CaCl_2$; FIG. 4B shows no mucilage and $CaCl_2$ present at 20 mM; and FIG. 4C shows mucilage (2 ppm) and $CaCl_2$ present at 20 mM.

Figures 8A, 8B:
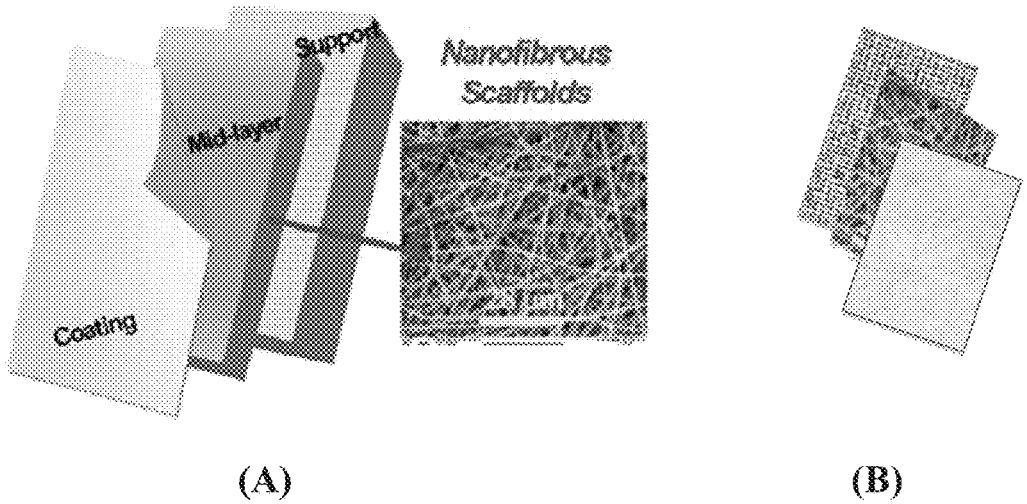
FIGS. 8A and 8B show schematics of filtration members using a support or scaffold including electrospun nanofibers according to embodiments of the present invention [19].

The electrospun nanofibrous membranes of the present invention possess several attributes that make them very attractive in water filtration technology. These include, but are not limited to, high porosity, pore sizes ranging from tens of nanometers to several micrometers, interconnected open pore structure, and a large surface area per unit volume. FIG. 8A and FIG. 8B show a depiction of filtration membranes using a nanofibrous scaffold as a nanofibrous membrane.

EXEMPLIFIED EMBODIMENTS

The invention includes, but is not limited to, the following embodiments:

Embodiment 1

An electrospun nanofiber, including a cactus mucilage.

Embodiment 2

The electrospun nanofiber according to embodiment 1, wherein the cactus mucilage is *Opuntia ficus-indica* (Ofi) mucilage.

Embodiment 3

The electrospun nanofiber according to any of embodiments 1-2, further including an organic polymer.

Embodiment 4

The electrospun nanofiber according to embodiment 3, wherein the organic polymer is polyvinyl alcohol (PVA).

Embodiment 5

A nanofibrous membrane, including at least one electrospun nanofiber according to any of embodiments 1-4.

Embodiment 6

A method of producing an electrospun nanofiber, including:
    forming an electrospinning solution including a cactus mucilage and an organic polymer; and
    electrospinning the electrospinning solution to form the electrospun nanofibril.

Embodiment 7

The method according to embodiment 6, wherein forming the electrospinning solution includes:
    dissolving the cactus mucilage in a first solvent to form a first solution;
    dissolving the organic polymer in a second solvent to form a second solution; and combining the second solution and the first solution to form the electrospinning solution.

Embodiment 8

The method according to any of embodiments 6-7, wherein the cactus mucilage is *Opuntia ficus-indica* (Ofi) mucilage.

Embodiment 9

The method according to any of embodiments 6-8, wherein the organic polymer is polyvinyl alcohol (PVA).

Embodiment 10

The method according to embodiment 9, wherein the organic polymer is PVA.

Embodiment 11

The method according to any of embodiments 7-10, wherein the first solvent includes acetic acid.

Embodiment 12

The method according to any of embodiments 6-11, wherein electrospinning the solution includes electrospinning the solution in an electric field of from about $1.5 \times 10^5$ V/m to about $3.5 \times 10^5$ V/m.

Embodiment 13

The method according to any of embodiments 7-12, wherein the second solvent is water.

Embodiment 14

The method according to any of embodiments 6-13, wherein the electrospinning solution includes the organic polymer and the cactus mucilage present in a ratio of 70:30 (polymer:mucilage).

Embodiment 15

The method according to any of embodiments 6-13, wherein the electrospinning solution includes the organic polymer and the cactus mucilage present in a ratio of 50:50 (polymer:mucilage).

Embodiment 16

The method according to any of embodiments 7-15, wherein the cactus mucilage is Ofi mucilage, wherein the organic polymer is PVA, and wherein the second solution includes 9% (w/w) PVA.

Embodiment 17

The method according to any of embodiments 7-16, wherein the second solution is a 28.4 M 9% PVA solution.

Embodiment 18

The method according to any of embodiments 7-16, wherein the second solution is an 80 M 9% PVA solution.

Embodiment 19

The method according to any of embodiments 7-14, wherein the cactus mucilage is Ofi mucilage, wherein the organic polymer is PVA, and wherein the second solution includes 11% (w/w) PVA.

Embodiment 20

The method according to any of embodiments 7-14 and 19, wherein the second solution is a 28.4 M 11% PVA solution.

Embodiment 21

A method of filtering contaminants from a fluid, including:
providing a nanofibrous membrane; and
passing the fluid through the nanofibrous membrane, such that the nanofibrous membrane absorbs at least one contaminant from the fluid,
wherein the nanofibrous membrane comprise at least one electrospun nanofiber including a cactus mucilage.

Embodiment 22

The method according to embodiment 21, wherein the fluid is water.

Embodiment 23

The method according to any of embodiments 21-22, wherein the cactus mucilage is *Opuntia ficus-indica* (Ofi) mucilage.

Embodiment 24

The method according to any of embodiments 21-23, wherein the at least one electrospun nanofiber further includes an organic polymer.

Embodiment 25

The method according to embodiment 24, wherein the organic polymer is polyvinyl alcohol (PVA).

Materials and Methods

Figure 9:
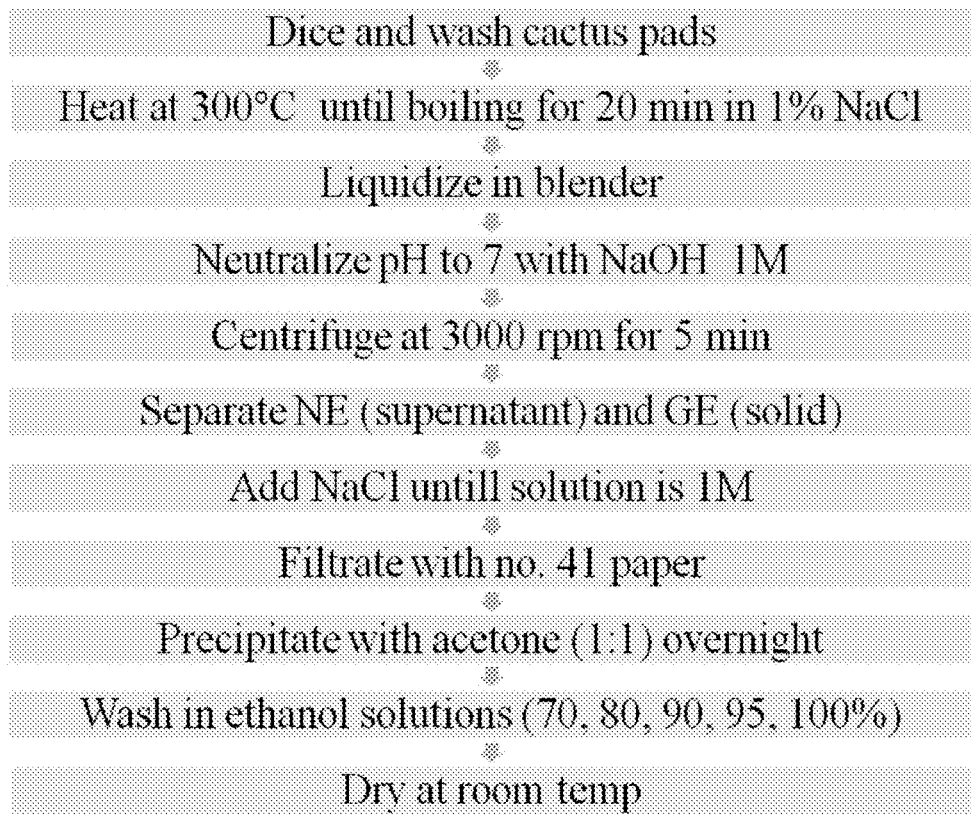
FIG. 9 shows an extraction process flow for non-gelling mucilage.

FIG. 9 shows a process flow for a procedure for extracting mucilage from the *Opuntia-ficus indica* (Ofi). The pad of the cactus can be washed with hard water and deionized water and then dried. The pad can then be sliced in, e.g., half-inch squares and placed into a beaker. A 1% w/w solution of NaCl can be poured into the beaker until the cut mucilage is covered. The beaker can then be heated on a hot plate and set to 300° C. or about 300° C. until the solution boils. The temperature can then be lowered to 200° C. or about 200° C. and then cooked for another 20 minutes, stirring occasionally. The cactus pads change color from a bright green to an olive green color when cooked. Stirring occasionally helps to ensure even heating.

The mixture can then be set to cool and then liquidized in a blender. The pH of the mixed solution at this time should be about 4. The pH of the mixed solution can then be neutralized to a pH of 7 or about 7 with, e.g., a 1 M solution of NaOH. The neutralized cactus mixture can then be centrifuged at 3,000 rpm for about 5 minutes. The supernatant can be separated as the non-gelling extract (NE), and the solid is the gelling extract (GE). For the examples provided herein, only the NE was used, though embodiments of the present invention are not limited thereto.

The supernatant can be mixed with NaCl for a 1M solution. It can then be vacuum-filtered using, e.g., filter paper number 41. The filtered liquid can then be mixed with acetone in a one to one ratio (1:1) and left covered under a ventilation hood overnight. The precipitate can then be taken out and washed with ethanol solutions of 70, 80, 90, 95, and/or 100% v/v. The washed solid can then be left to dry covered in the ventilation hood. Depending on the amount of mucilage extracted, this may take 2 to 3 days to dry and can be placed in an oven at 50° C. for a few hours to accelerate the drying process. The resulting dried mucilage can be put in a mortar and pestle to be grounded into powder form. The resulting mucilage powder can be used to create nanofibers.

The mucilage power can be mixed at a 4% w/w with a solution of acetic acid (AA) and deionized water. The AA can be mixed with deionized water at a 50% w/w. Mucilage and acid can be mixed at 60° C. (or about 60° C.) at 600 rpm and covered to avoid evaporation for 8-10 hours or until the solution is a consistent mixture. A tissue grinder can be used to help ensure even mixture of the mucilage acid solution and to help prohibit the formation of clusters and/or reduce the size of such clusters that may form.

The mucilage solution can be mixed with a polymer solution. The polymer solution can be, for example, polyvinyl alcohol (PVA). PVA can be used at two different molecular weights. The lower molecular weight (28.4 M) can be mixed in four different concentrations—7%, 9%, 11%, and 20%. The higher molecular weight PVA (80 M) can be mixed at a 9% concentration solution. All solutions can be mixed with deionized water at 125° C. at 900 rpm and covered for approximately 1.25 hours or until PVA has thorough consistency.

A 4% w/w mucilage with a 50% w/w AA was achieved. There appeared to be no difference in fiber formation between using 90% w/w AA mix and using 50% AA mix. The 50% w/w AA was less caustic. A tissue grinder was used to get a good homogeneous mixture after several hours of magnetic stirring.

A PVA solution can be mixed with a mucilage/AA mixture. PVA solutions at different concentrations and molecular weights can be mixed with mucilage/AA mixtures to give different ratios of PVA:mucilage. For example, a 9% PVA solution can be mixed by volumetric ratios of 70:30, 50:50, and 30:70 (PVA:mucilage) with mucilage for the lower molecular weight of 28.4 M PVA. The higher molecular weight PVA of 80 M can be mixed at a ratio of 70:30 (PVA:mucilage) with the mucilage solution. Table 2, which should not be construed as limiting, shows examples of PVA solutions and resulting PVA:mucilage ratios that can be used. The examples shown in Table 2 were used for the examples provided herein. Each of these mixtures was heated to 60° C. at 600 rpm for about 30 minutes.

TABLE 2

PVA and Mucilage Ratio Mixtures

| | Ratios (PVA:Mucilage) |
|---|---|
| PVA (28.4M) | |
| 7% | 70:30 |
| 9% | 70:30 |
| | 50:50 |
| | 30:70 |
| 11% | 70:30 |
| PVA (80M) | |
| 9% | 70:30 |

Achieving a well-mixed PVA can be difficult at some percentages. PVA at 7%, 9%, and 11% were used for the examples provided herein. The 20% solution of the lower MW PVA was too thick and burned before being thoroughly mixed. Table 4, which should not be construed as limiting, shows characteristics of examples of PVA solutions that can be used. The examples shown in Table 3, except for the 20% 28.4 M solution, were used for the examples provided herein.

TABLE 3

PVA Experimental Mixtures

| PVA 28.4M | |
|---|---|
| 7% | good solution |
| 9% | good solution |
| 11% | good solution |
| 20% | solution did not mix |
| PVA 80M | |
| 9% | good solution |

The PVA and mucilage solutions were mixed together but it was observed that after several hours the mucilage and PVA would start to separate. More mixing and agitation would bring them back together.

Figure 30:
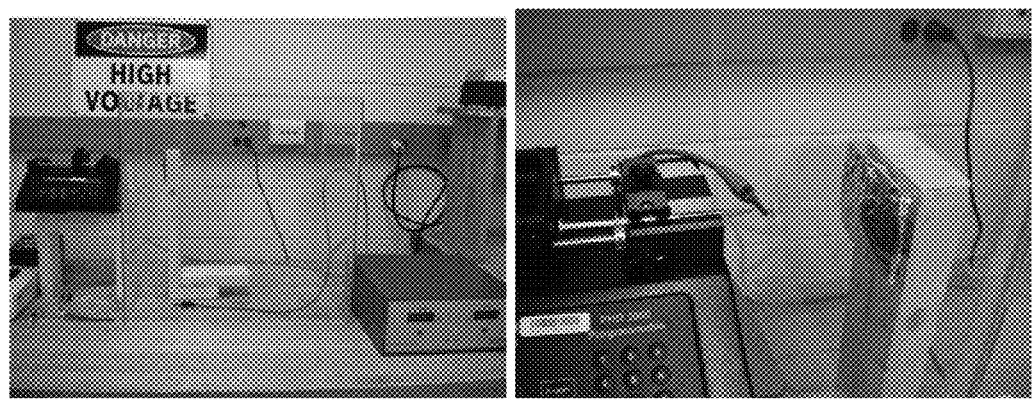
FIG. 30 shows (A) an image of an electrospinning experimental setup, and (B) a close-up image of a syringe and a collector plate.

The resulting PVA/mucilage mixture can be used as feedstock for electrospinning to produce electrospun nanofibers. The electrospinning field can be set inside an enclosed box to reduce electrostatic interference, other electric fields, and other factors that may impede the optimum formation of fibers. FIG. 5 shows a schematic of an electrospinning apparatus that can be used according to embodiments of the present invention. A syringe pump can be used for continuous feed of feedstock solution over extended time periods. The collector can be electrically conductive, and the voltage can be on the order of kilovolts (kV) or tens of kVs. For the examples provided herein, the power supply used was a Spectrovision DA-30. The syringe pump was a Harvard Apparatus PHD 2000. FIG. 30A shows a view of the experimental setup, and FIG. 30B shows a close-up of a syringe and collector plate.

For the examples provided herein, the parameters for electrospinning were set as shown in Table 4. Earlier experiments showed that the parameters were advantageous for to produce good nanofibers. The distance between the needle tip and collector plate was varied to produce differences in fiber diameter and shape. The values given in Table 4 are examples of values for the parameters that can be used according to embodiments of the subject invention and should not be construed as limiting.

TABLE 4

Parameters Set for Electrospinning Setup

| Electrospinning Parameters | Values |
|---|---|
| Voltage | 20~22 kV |
| Syringe | 1 mL |
| Syringe Diameter | 4 mm |
| Needle* | 18 ½" gauge |
| | 22 1" gauge |
| Infusion Rate | 2.5 µL/min |
| Distance (needle tip and collector plate)* | 7-13 cm |

*Changed between experiments

Nanofibers were characterized using a Scanning Electron Microscope, Atomic Force Microscopy, and Differential Scanning calorimetry.

EXAMPLES

Following are examples that illustrate procedures for practicing the invention. These examples should not be construed as limiting.

Example 1-7% PVA and Mucilage in a Ratio of 70:30 (PVA:Mucilage)

A 7% PVA solution and mucilage in a ratio of 70:30 (PVA:mucilage) was used for electrospinning. No fibers formed and it was difficult to capture images of the dots and deformities that formed.

Example 2-9% PVA and Mucilage in a Ratio of 30:70 (PVA:Mucilage)

Figure 13:
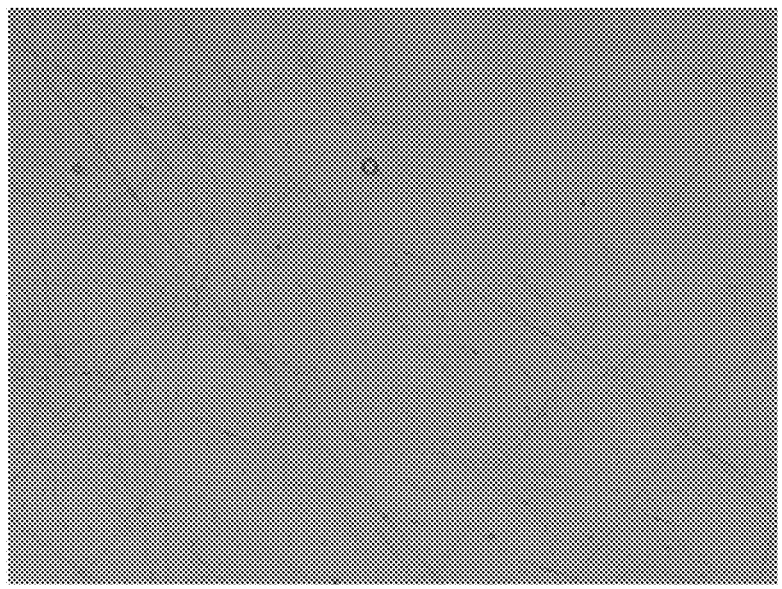
FIG. 13 shows a microscopic image of electrospun nanofibers according to an embodiment of the present invention. The magnification is 50×. The feedstock was 9% PVA and mucilage in a ratio of 30:70 (PVA:mucilage).
Figure 29:
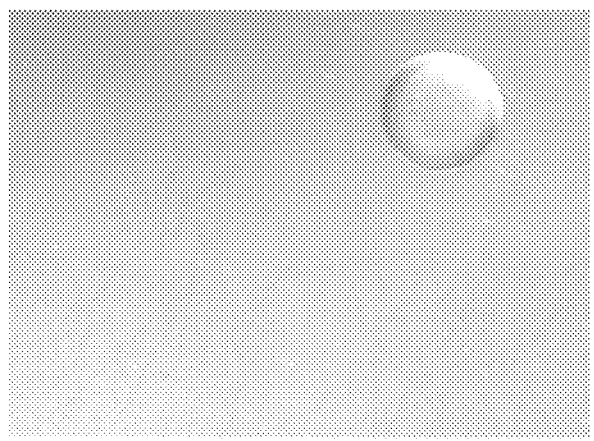
FIG. 29 shows a microscopic image of electrospun nanofibers according to an embodiment of the present invention. The magnification is 100×. The feedstock was 9% PVA and mucilage in a ratio of 30:70 (PVA:mucilage).

A 9% PVA solution and mucilage in a ratio of 30:70 (PVA:mucilage) was used for electrospinning. Although some fibers formed, there appeared to be not enough polymer mixtures because there were many dots and deformities. FIG. 13 shows a microscopic image of beads and few electrospun nanofibers formed from electrospinning a feedstock of 9% PVA and mucilage in a ratio of 30:70 (PVA:mucilage). The magnification is 50×. FIG. 29 also shows a microscopic image of beads and few electrospun nanofibers formed from electrospinning a feedstock of 9% PVA and mucilage in a ratio of 30:70 (PVA:mucilage). The magnification in FIG. 29 is 100×.

Example 3-9% PVA and Mucilage in a Ratio of 50:50 (PVA:Mucilage)

Figure 14:
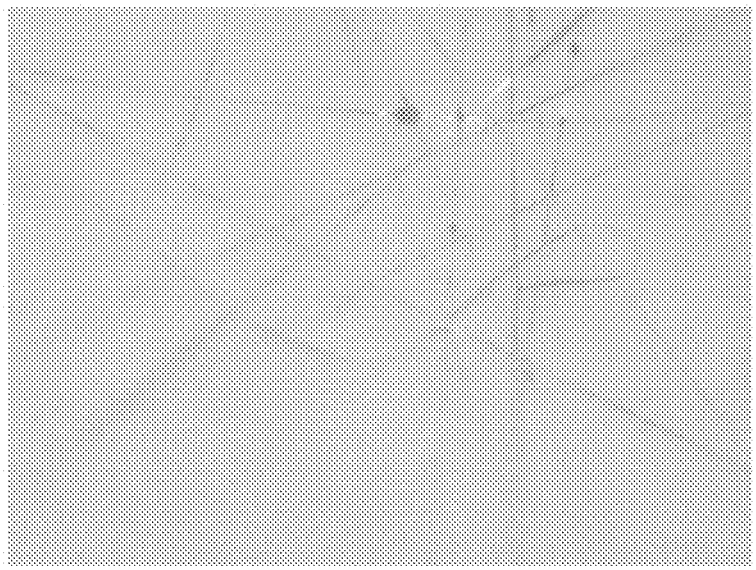
FIG. 14 shows a microscopic image of electrospun nanofibers according to an embodiment of the present invention. The magnification is 100×. The feedstock was 9% PVA and mucilage in a ratio of 50:50 (PVA:mucilage).

A 9% PVA solution and mucilage in a ratio of 50:50 (PVA:mucilage) was used for electrospinning. Although some deformities were present, fibers appeared to have much higher quality than those in Example 2. FIG. 14 shows a microscopic image of electrospun nanofibers formed from electrospinning a feedstock of 9% PVA and mucilage in a ratio of 50:50 (PVA:mucilage). The magnification is 100×.

Example 4-9% PVA and Mucilage in a Ratio of 70:30 (PVA:Mucilage)

Figure 10:
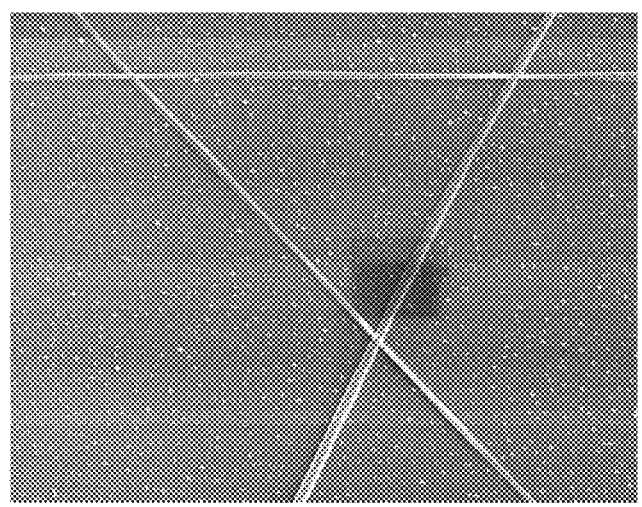
FIG. 10 shows an SEM image of electrospun nanofibers according to an embodiment of the present invention. The magnification is 11K×. The feedstock was 9% PVA and mucilage in a ratio of 70:30 (PVA:mucilage).
Figure 11:
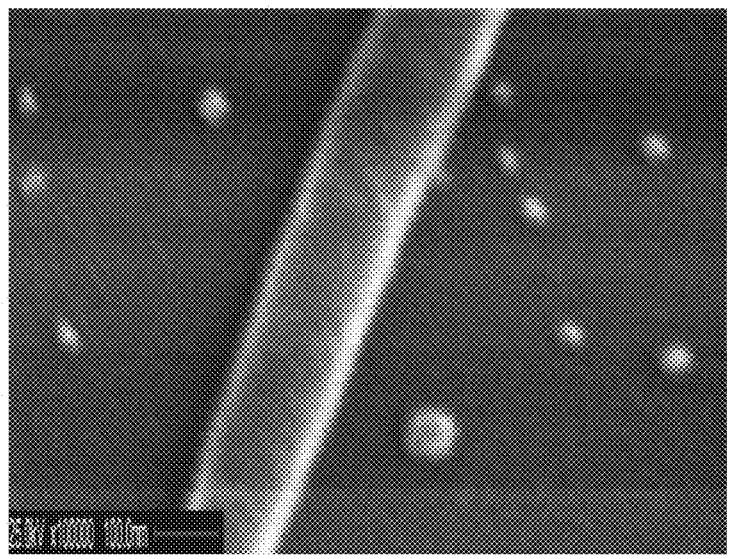
FIG. 11 shows an SEM image of electrospun nanofibers according to an embodiment of the present invention. The magnification is 100K×. The feedstock was 9% PVA and mucilage in a ratio of 70:30 (PVA:mucilage).

A 9% PVA solution and mucilage in a ratio of 70:30 (PVA:mucilage) was used for electrospinning. Thin, flat-looking fibers formed that measured about 180 nm in diameter. FIG. 10 shows an SEM image of electrospun nanofibers formed from electrospinning a feedstock of 9% PVA and mucilage in a ratio of 70:30 (PVA:mucilage). The magnification is 11K×. FIG. 11 also shows an SEM image of electrospun nanofibers formed from electrospinning a feedstock of 9% PVA and mucilage in a ratio of 70:30 (PVA:mucilage). The magnification in FIG. 11 is 100K×. For SEM images, the samples were sputtered with gold.

Overall, a larger amount of fibers were formed with fewer deformities, as compared to those in Examples 2 and 3. These results lead to the conclusion that at a higher PVA ratio more polymers were present in order to start forming fibers with fewer deformities.

Figure 12:
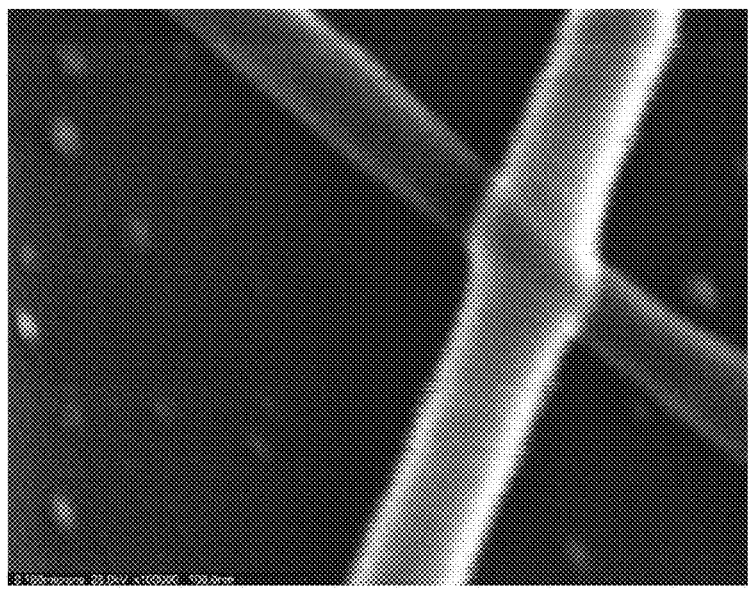
FIG. 12 shows an SEM image of electrospun nanofibers according to an embodiment of the present invention. The magnification is 100K×. The feedstock was 9% PVA and mucilage in a ratio of 70:30 (PVA:mucilage).
Figure 15:
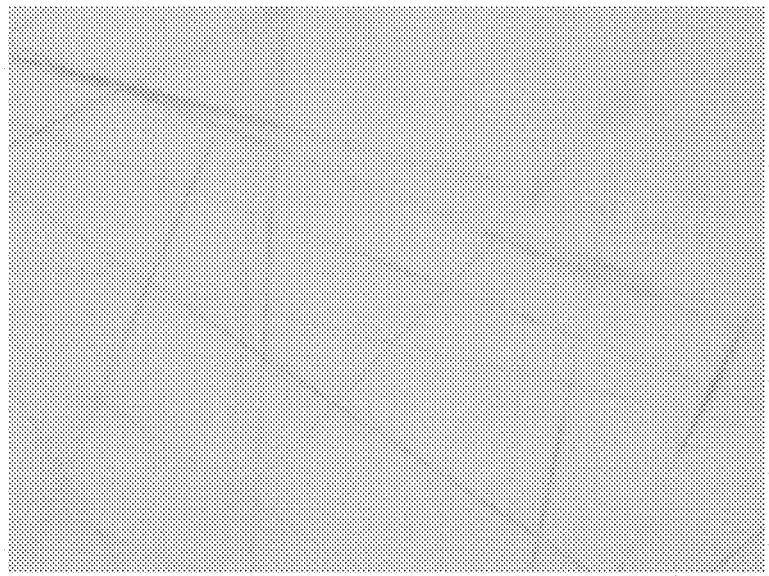
FIG. 15 shows a microscopic image of electrospun nanofibers according to an embodiment of the present invention. The magnification is 1000×. The feedstock was 9% PVA and mucilage in a ratio of 70:30 (PVA:mucilage).

FIG. 12 shows an SEM image (magnification of 11K×) of electrospun nanofibers formed from electrospinning a feedstock of 9% PVA and mucilage in a ratio of 70:30 (PVA:mucilage). FIG. 15 shows a microscopic image (magnification of 1000×) of electrospun nanofibers formed from electrospinning a feedstock of 9% PVA and mucilage in a ratio of 70:30 (PVA:mucilage).

Example 5-11% PVA and Mucilage in a Ratio of 70:30 (PVA:Mucilage)

Figure 16:
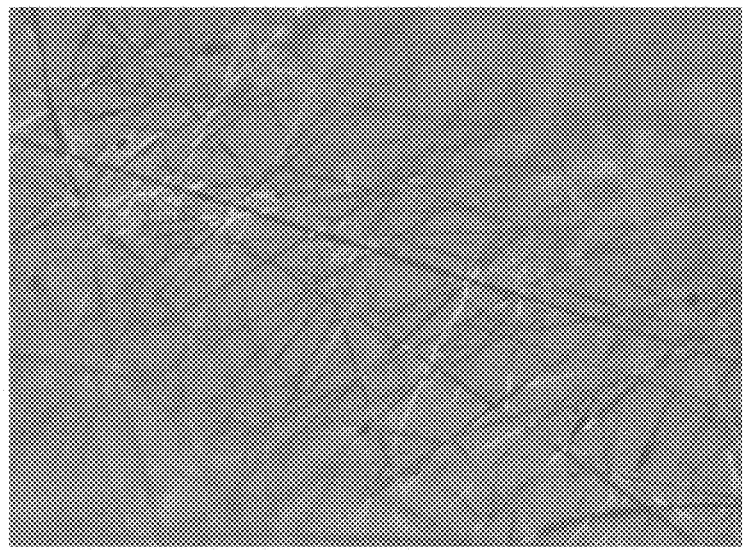
FIG. 16 shows a microscopic image of electrospun nanofibers according to an embodiment of the present invention. The magnification is 100×. The feedstock was 11% PVA and mucilage in a ratio of 70:30 (PVA:mucilage).
Figure 17:
FIG. 17 shows a top view SEM image of electrospun nanofibers according to an embodiment of the present invention. The feedstock was 11% PVA and mucilage in a ratio of 70:30 (PVA:mucilage).

An 11% PVA solution and mucilage in a ratio of 70:30 (PVA:mucilage) was used for electrospinning. Many more fibers were produced than in Examples 2-4. The fibers were measured as thin as 52 nm up to 8 µm and even thicker. FIG. 16 shows a microscopic image (magnification of 100×) of electrospun nanofibers formed from electrospinning a feedstock of 11% PVA and mucilage in a ratio of 70:30 (PVA:mucilage). FIG. 17 shows a top view SEM image of electrospun nanofibers formed from electrospinning a feedstock of 11% PVA and mucilage in a ratio of 70:30 (PVA:mucilage).

Figure 18:
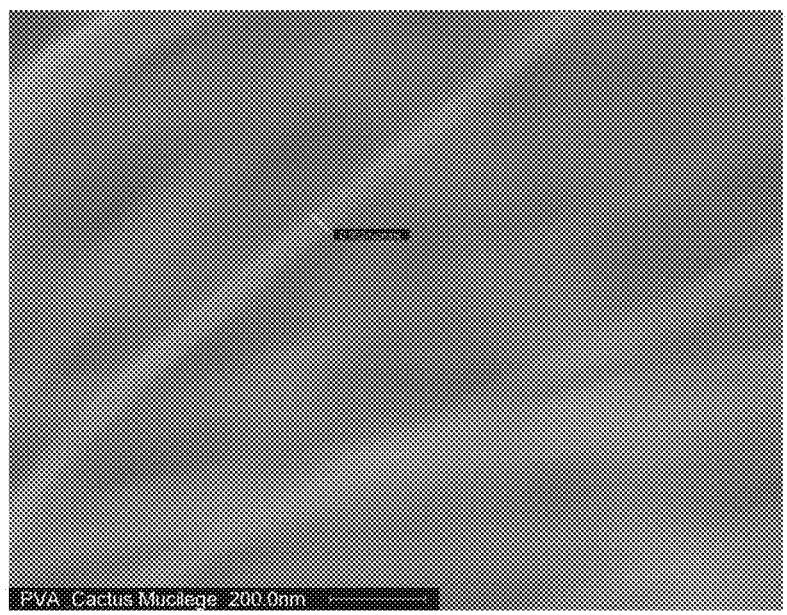
FIG. 18 shows an SEM image of electrospun nanofibers according to an embodiment of the present invention. The magnification is 70K×. The feedstock was 11% PVA and mucilage in a ratio of 70:30 (PVA:mucilage). A fiber diameter measured about 52 nm.

FIG. 18 shows an SEM image (magnification of 70K×) of electrospun nanofibers formed from electrospinning a feedstock of 11% PVA and mucilage in a ratio of 70:30 (PVA:mucilage). A fiber measured 52 nm in diameter.

Figure 19:
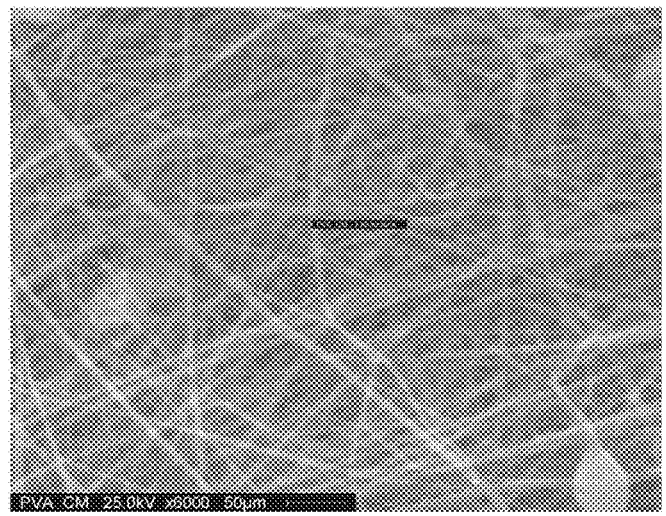
FIG. 19 shows an SEM image of electrospun nanofibers according to an embodiment of the present invention. The magnification is 6K×. The feedstock was 11% PVA and mucilage in a ratio of 70:30 (PVA:mucilage). The fiber diameter measured about 7.8 μm.

FIG. 19 shows an SEM image (magnification of 6K×) of electrospun nanofibers formed from electrospinning a feedstock of 11% PVA and mucilage in a ratio of 70:30 (PVA:mucilage). A fiber measured 7.8 µm in diameter.

Example 6-9% PVA and Mucilage (70:30 PVA:Mucilage) at Low Molecular Weight

Figures 20A, 20B:
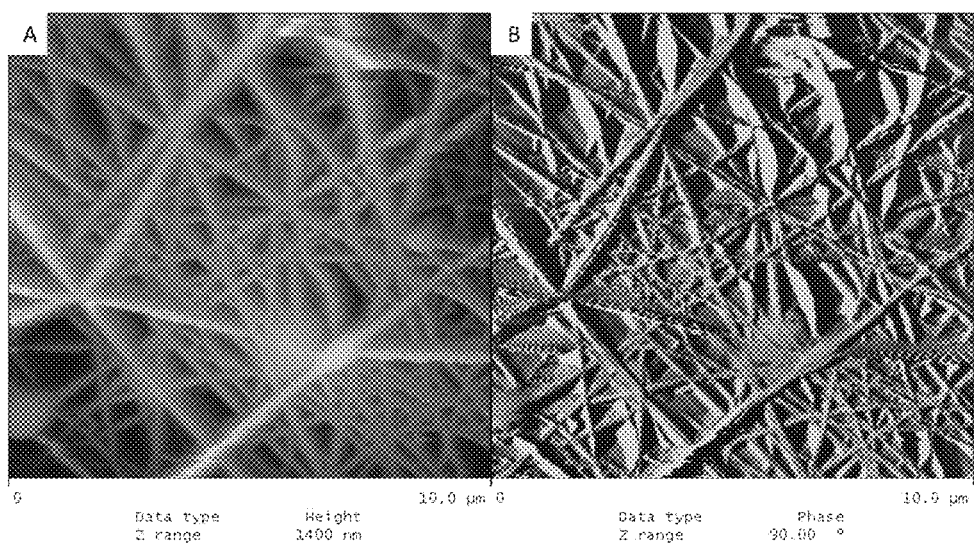
FIGS. 20A and 20B show AFM images at 10 μm of electrospun nanofibers according to an embodiment of the present invention. The feedstock was 9% low M PVA and mucilage in a ratio of 70:30 (PVA:mucilage).

A feedstock of 9% 28.4 M PVA and mucilage in a ratio of 70:30 (PVA:mucilage) was used for electrospinning. FIGS. 20A and 20B show AFM images at 10 µm of electrospun nanofibers produced using this feedstock. FIGS. 21A and 21B show AFM images at 1 µm of electrospun nanofibers produced using this feedstock. FIGS. 22A, 22B, and 22C show an AFM Sectional Analysis at 1 µm of these electrospun nanofibers. From the sectional analysis, a fiber diameter measurement of about 177 nm was obtained, which is very close to the previous measurement of 180 nm obtained from a previous mixture using an SEM image.

Figure 27:
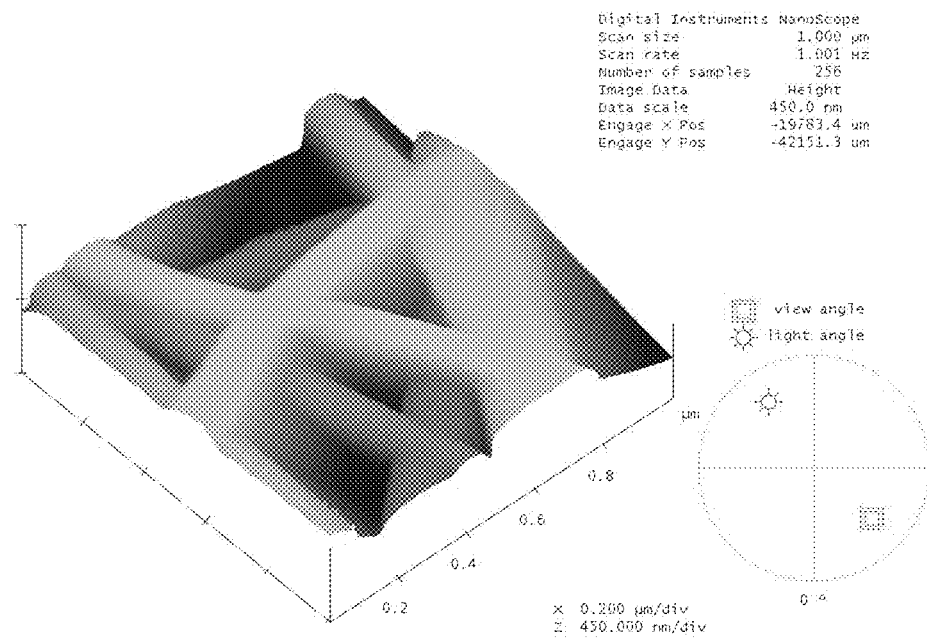
FIG. 27 shows a 3D AFM image at 1 μm of electrospun nanofibers according to an embodiment of the present invention. The feedstock was 9% low M PVA in a ratio of 70:30 (PVA:mucilage).

FIG. 27 shows a 3D AFM image at 1 µm of electrospun nanofibers using the feedstock of 9% 28.4 M PVA in a ratio of 70:30 (PVA:mucilage). The fibers appear to be very smooth with low porosity. This might change if PVA is removed.

Example 7-9% PVA and Mucilage (70:30 PVA:Mucilage) at High Molecular Weight

Figures 23A, 23B:
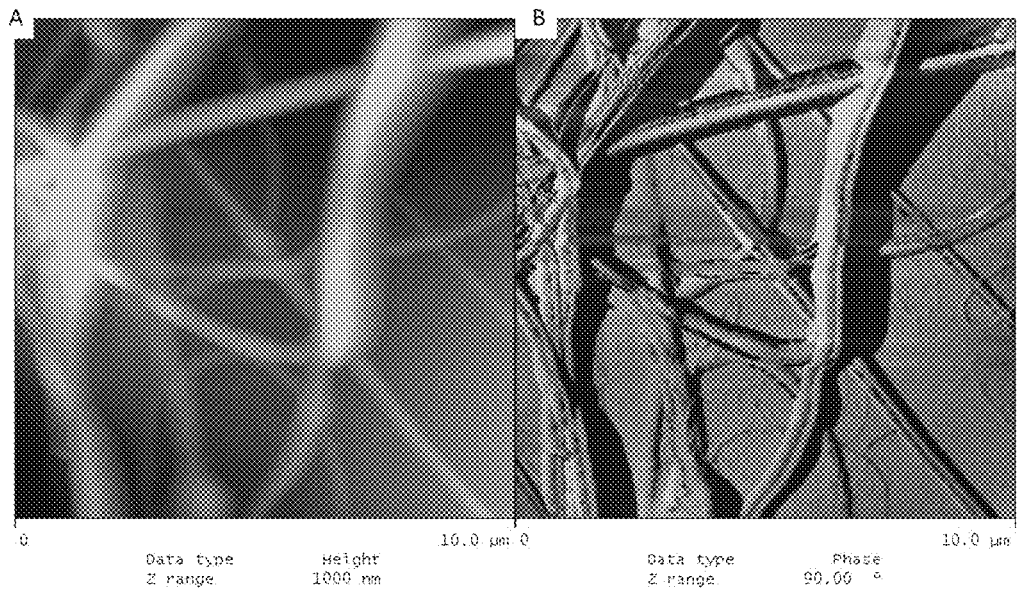
FIGS. 23A and 23B show AFM images at 10 μm of electrospun nanofibers according to an embodiment of the present invention. The feedstock was 9% high M PVA and mucilage in a ratio of 70:30 (PVA:mucilage).
Figures 24A, 24B:
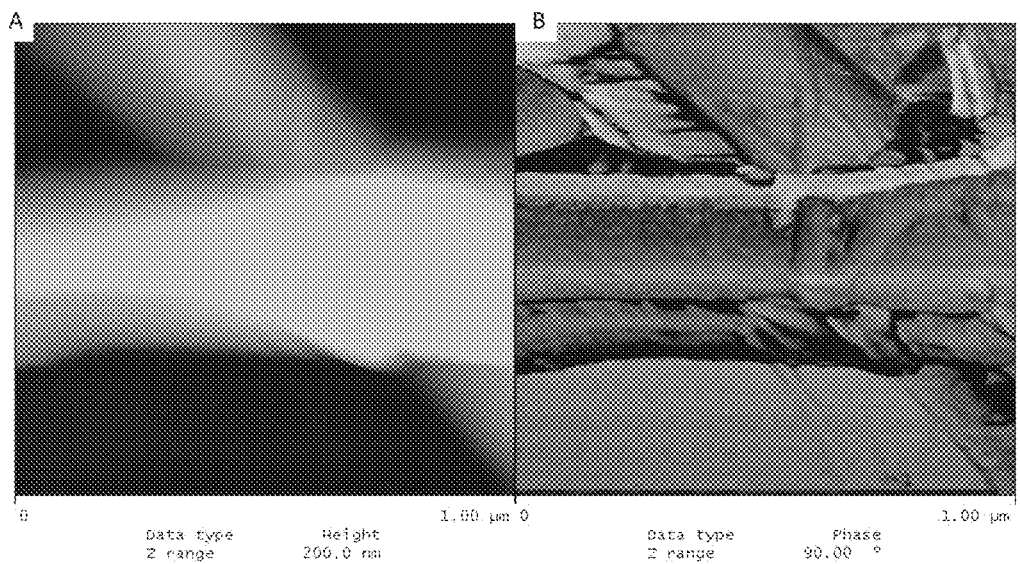
FIGS. 24A and 24B show AFM images at 1 μm of electrospun nanofibers according to an embodiment of the present invention. The feedstock was 9% high M PVA and mucilage in a ratio of 70:30 (PVA:mucilage).

A feedstock of 9% 80 M PVA and mucilage in a ratio of 70:30 (PVA:mucilage) was used for electrospinning. FIGS. 23A and 23B show AFM images at 10 µm of electrospun nanofibers produced using this feedstock. FIGS. 24A and 24B show AFM images at 1 µm of electrospun nanofibers produced using this feedstock. FIGS. 25A, 25B, and 25C show an AFM Sectional Analysis at 1 µm of these electrospun nanofibers. From the sectional analysis, a fiber diameter measurement of about 460 nm was obtained.

FIGS. 26A, 26B, and 26C show an AFM Sectional Analysis at 1 µm of a different sample of electrospun nanofibers produced using a feedstock of 9% 80 M PVA and mucilage in a ratio of 70:30 (PVA:mucilage). From the sectional analysis, a fiber diameter measurement of about 4 µm was obtained.

The AFM images show that this feedstock produces a bigger mix of fibers with different diameters than the feedstock of Example 6. The diameters are overall much larger than the fibers of Example 6.

Figure 28:
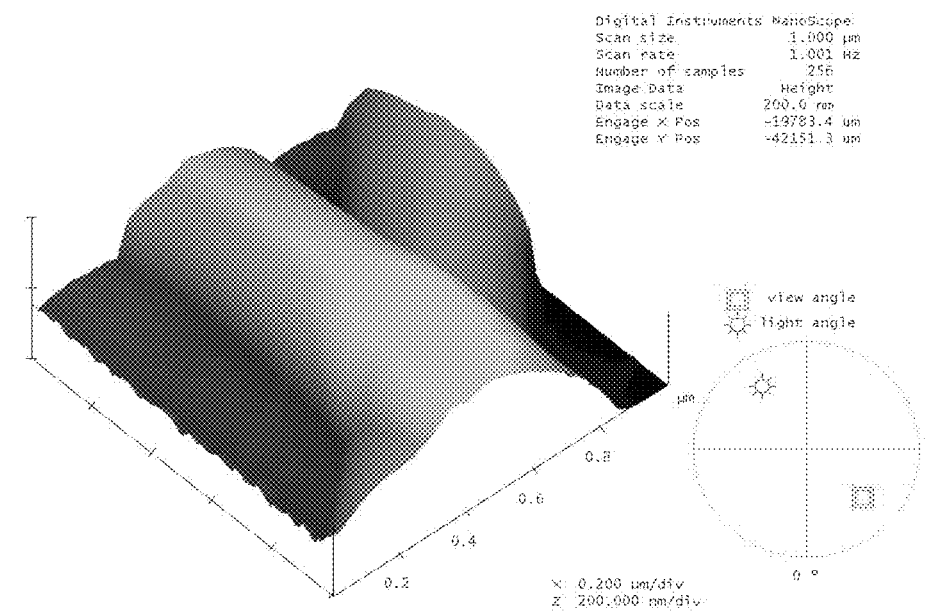
FIG. 28 shows a 3D AFM image at 1 μm of electrospun nanofibers according to an embodiment of the present invention. The feedstock was 9% high M PVA in a ratio of 70:30 (PVA:mucilage).

FIG. 28 shows a 3D AFM image at 1 µm of electrospun nanofibers using the feedstock of 9% 80 M PVA in a ratio of 70:30 (PVA:mucilage). The fibers appear to be very smooth with low porosity. This might change if PVA is removed.

Example 8—NaOH and Water Washes

Figure 31:
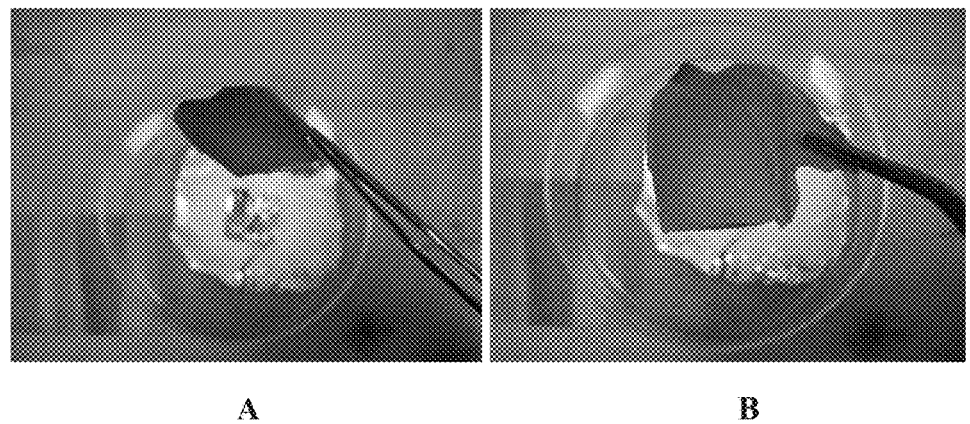
FIGS. 31A and 31B show images of mucilage and PVA nanofiber meshes according to an embodiment of the present invention.

PVA was removed from the nanofiber structures. This is done so that pure mucilage fibers can be obtained. The experiment had positive results. FIGS. 31A and 31B show views of the pretreated mesh.

Figure 32:
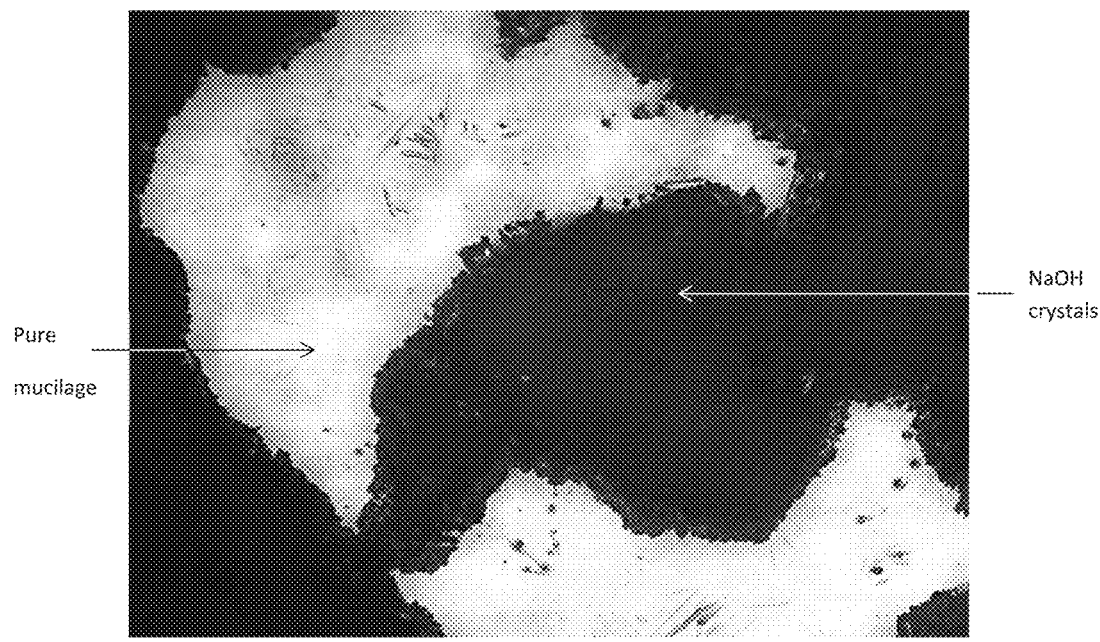
FIG. 32 shows a microscopic image of NaOH and mucilage nanofibers. The magnification is 20×.

First, a 0.5 M NaOH wash was performed on a PVA-only and a PVA-mucilage nanofiber mesh and set to dry over 24 hours in an oven at 30° C. The NaOH seemed to remove the PVA particles but crystalline formations were observed after drying in both meshes. FIG. 32 shows a microscopic image (20× magnification) of the crystals and the still intact mucilage mesh.

Figure 33:
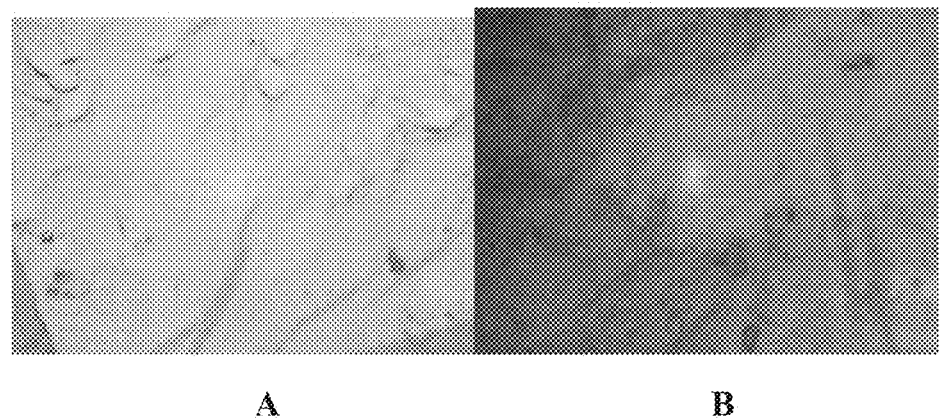
FIG. 33 shows mucilage nanofibers according to an embodiment of the present invention. The magnification is (A) 50× and (B) 100×.

Next, a second set of experiments were performed with just deionized water on the PVA-only and PVA-mucilage mesh. The water seemed to wash away all the PVA since no nanofiber structures were seen in the PVA-only mesh. Nanofibers were still intact in the PVA-mucilage mesh although the mesh seemed to lose most of its content. This was expected since 70% of the mesh is composed of PVA. FIG. 33 shows microscopic images of pure mucilage nanofibers (magnification in FIG. 33A is 50× and in FIG. 33B is 100×).

Example 9—DSC Test

A differential scanning calorimetry (DSC) test was performed on nanofiber mesh. PVA at 9% (w/w) alone gave a melting point of 222.53° C. Mucilage and PVA high molecular weight at 9% melting point was 214.89° C. Also, mucilage and PVA low molecular weight at 9% melting point was 216.27° C.

Both PVA-mucilage mixtures were at a ratio of 70:30. These two mixtures had a melting point difference of 2° C. which is not very significant. The pure PVA at 222.53° C. is higher than the other two samples but not a very considerable difference. Thus, the mucilage is lowering the melting point of the PVA nanofibers.

Figure 34:
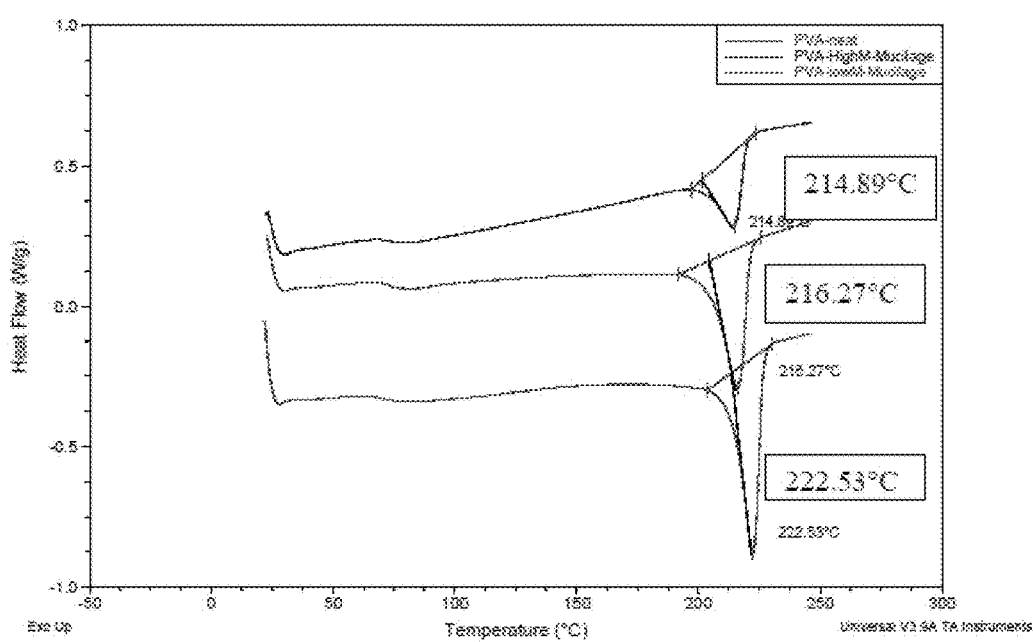
FIG. 34 shows a plot of heat flow as a function of temperature for PVA-neat, PVA and high molecular weight mucilage, and PVA and low molecular weight mucilage.

FIG. 34 shows a plot of heat flow as a function of temperature for PVA-neat (green line, lower-most on the plot), PVA-high molecular weight mucilage (black line, uppermost on the plot), and PVA-low molecular weight mucilage (red line, middle line on the plot).

All patents, patent applications, provisional applications, and publications referred to or cited herein, and/or listed in the References section, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1] A. Prüss-Üstiin, R. Bos, F. Gore, and J. Bartram, *Safer water, better health: costs, benefits and sustainability of interventions to protect and promote health*, Geneva: World Health Organization, 2008.

[2] N. Savage and M. S. Diallo, "Nanomaterials and Water Purification: Opportunities and Challenges," *Journal of Nanoparticle Research*, vol. 7, October 2005, pp. 331-342.

[3] L. Pasteur, "The History of Drinking Water Treatment," *Public Health*, 2000.

[4] APEC, "Different Water Filtration Methods Explained," *Freedrinkingwater.com*.

[5] K. A. Young, "The Mucilage of *Opuntia Ficus Indica*: A Natural, Sustainable, and Viable Water Treatment Technology for Use in Rural Mexico for Reducing Turbidity and Arsenic Contamination in Drinking Water," University of South Florida, 2006.

[6] R. Gopal, S. Kaur, Z. Ma, C. Chan, S. Ramakrishna, and T. Matsuura, "Electrospun nanofibrous filtration membrane," *Journal of Membrane Science*, vol. 281, September 2006, pp. 581-586.

[7] B. Van der Bruggen and C. Vandecasteele, "Removal of pollutants from surface water and groundwater by nanofiltration: overview of possible applications in the drinking water industry.," *Environmental Pollution*, vol. 122, January 2003, pp. 435-445.

[8] H. Nicoll, "Water Needs, Unique Research Arrangement Lead to Membrane Development," *Water Quality Products*, vol. 6, 2001.

[9] "The Past, Present, and Future of Water Filtration Technology," *History of Water Filters.com*.

[10] K. Boussu, B. Vanderbruggen, a Volodin, C. Vanhaesendonck, J. Delcour, P. Vandermeeren, and C. Vandecasteele, "Characterization of commercial nanofiltration membranes and comparison with self-made polyethersulfone membranes," *Desalination*, vol. 191, May. 2006, pp. 245-253.

[11] J.-C. Lee, H.-R. Kim, J. Kim, and Y.-S. Jang, "Antioxidant property of an ethanol extract of the stem of *Opuntia ficus-indica* var. saboten.," *Journal of agricultural and food chemistry*, vol. 50, October 2002, pp. 6490-6.

[12] R. Kiesling, "Origen, Domesticación y Distribución de *Opuntia ficus-indica*," America, vol. 22, 1995, pp. 4747-4748.

[13] G. K. Jani, D. P. Shah, V. D. Prajapati, and V. C. Jain, "Gums and mucilages: versatile excipients for pharmaceutical formulations," *Journal of Pharmaceutical Sciences*, vol. 4, 2009, pp. 309-323.

[14] A. Cárdenas and F. M. Goycoolea, "Rheology and Aggregation of Cactus (*Opuntia ficus-indica*) Mucilage in Solution," 1997, pp. 152-159.

[15] C. Saenz, "*Opuntia* spp mucilages: a functional component with industrial perspectives," *Journal of Arid Environments*, vol. 57, May. 2004, pp. 275-290.

[16] A. L. Buttice, "Reducing Sediment and Bacterial Contamination in Water Using Mucilage Extracted from the," University of South Florida, 2009.

[17] Z. Huang, "A review on polymer nanofibers by electrospinning and their applications in nanocomposites," *Composites Science and Technology*, vol. 63, November 2003, pp. 2223-2253.

[18] H. Yan, L. Liu, and Z. Zhang, "Alignment of electrospun nanofibers using dielectric materials," *Applied Physics Letters*, vol. 95, 2009, p. 143114.

[19] Y. Zhang, X. Huang, B. Duan, L. Wu, S. Li, and X. Yuan, "Preparation of electrospun chitosan/poly(vinyl alcohol) membranes," *Colloid and Polymer Science*, vol. 285, January 2007, pp. 855-863.

[20] M. Ziabari, V. Mottaghitalab, and a K. Haghi, "Application of direct tracking method for measuring electrospun nanofiber diameter," *Brazilian Journal of Chemical Engineering*, vol. 26, March 2009, pp. 53-62.

[21] Y. Jia, J. Gong, X. Gu, H. Kim, J. Dong, and X. Shen, "Fabrication and characterization of poly (vinyl alcohol)/chitosan blend nanofibers produced by electrospinning method," *Carbohydrate Polymers*, vol. 67, February 2007, pp. 403-409.

[22] L. Buttafoco, N. G. Kolkman, P. Engbers-Buijtenhuijs, Poot, P. J. Dijkstra, I. Vermes, and J. Feijen, "Electrospinning of collagen and elastin for tissue engineering applications.," *Biomaterials*, vol. 27, February 2006, pp. 724-34.

[23] G. Ma, D. Yang, Y. Zhou, Y. Jin, and J. Nie, "Preparation and characterization of chitosan/poly(vinyl alcohol)/poly(vinyl pyrrolidone) electrospun fibers," *Frontiers of Materials Science in China*, vol. 1, October 2007, pp. 432-436.

[24] A. Frenot, M. W. Henriksson, and P. Walkenstro, "Electrospinning of Cellulose-Based Nanofibers," *Polymer*, 2006.

[25] H. Qi, X. Sui, J. Yuan, Y. Wei, and L. Zhang, "Electrospinning of Cellulose-Based Fibers From NaOH/Urea Aqueous System," *Macromolecular Materials and Engineering*, vol. 295, August 2010, pp. 695-700.

[26] S. Manandhar, S. Vidhate, and N. D'Souza, "Water soluble levan polysaccharide biopolymer electrospun fibers," *Carbohydrate Polymers*, vol. 78, November 2009, pp. 794-798.

[27] A. L. Buttice, "Reducing Sediment and Bacterial Contamination in Water Using Mucilage Extracted from the," University of South Florida, 2009.

[28] Buttice, A. L., Stroot, J. M., Lim, D. V., Stroot, P. G., and Alcantar, N. A., "Removal of Sediment and Bacteria from Water Using Green Chemistry," *Environmental Science & Technology*, 2010.

We claim:

1. A method of producing an electrospun nanofiber, comprising:
    forming an electrospinning solution comprising a cactus mucilage and an organic polymer; and
    electrospinning the electrospinning solution to form the electrospun nanofibril.

2. The method according to claim 1, wherein forming the electrospinning; solution comprises:
    dissolving the cactus mucilage in a first solvent to form a first solution;
    dissolving the organic polymer in a second solvent to form a second solution; and
    combining the second solution and the first solution to form the electrospinning solution.

3. The method according to claim 1, wherein the cactus mucilage is *Opuntia ficus-indica* (Ofi) mucilage.

4. The method according to claim 3, wherein the organic polymer is polyvinyl alcohol (PVA).

5. The method according to claim 1, wherein the organic polymer is PVA, chitosan, polyethylene glycol (PEG), or poly lactic acid (PLA).

6. The method according to claim 2, wherein the first solvent comprises acetic acid, and wherein the second solvent is water.

7. The method according to claim 1, wherein electrospinning; the solution comprises electrospinning the solution in an electric field of from about $1.5 \times 10^5$ V/m to about $3.5 \times 10^5$ V/m.

8. The method according to claim 2, wherein the electrospinning solution comprises the organic polymer and the cactus mucilage present in a ratio of either 70:30 or 50:50 (polymer:mucilage).

9. The method according to claim 1, wherein the cactus mucilage has a linear repeating chain of (1→4)-linked β-D-galacturonic acid and an α(1→2)-linked L-rhamnose with trisaccharide side chains of β(1→6)-linked D-galactose attached at O(4) of L-rhamnose residues.

10. The method according to claim 1, wherein the cactus mucilage has 55 sugar residues.

11. The method according to claim 1, wherein the electrospun nanofibril has a diameter of 10 nm to 10 μm.

12. The method according to claim 1, wherein the cactus mucilage has a xylose to arabinose ratio of about 1:2 in its peripheral chains.

13. The method according to claim 1, wherein the organic polymer and the cactus mucilage are present in a ratio of either 70:30 or 50:50 (organic polymer:cactus mucilage).

14. A method of filtering contaminants from a fluid, comprising:
    providing a nanofibrous membrane; and
    passing the fluid through the nanofibrous membrane, such that the nanofibrous membrane absorbs at least one contaminant from the fluid,
    wherein the nanofibrous membrane comprise at least one electrospun nanofiber comprising a cactus mucilage.

15. The method according to claim 14, wherein the cactus mucilage is *Opuntia ficus-indica* (Ofi) mucilage.

16. The method according to claim 15, wherein the at least one electrospun nanofiber further comprises an organic polymer, wherein the organic polymer is polyvinyl alcohol (PVA).

17. The method according to claim 14, wherein the at least one electrospun nanofiber further comprises an organic polymer, wherein the organic polymer is PVA, chitosan, polyethylene glycol (PEG), or poly lactic acid (PLA), and wherein the fluid is water.

18. The method according to claim 14, wherein the cactus mucilage has a linear repeating chain of (1→4)-linked β-D-galacturonic acid and an α(1→2)-linked L-rhamnose with trisaccharide side chains of β(1→6)-linked D-galactose attached at O(4) of L-rhamnose residues.

19. The method according to claim 14, wherein the cactus mucilage has 55 sugar residues.

20. The method according to claim 14, wherein the electrospun nanofibril has a diameter of 10 nm to 10 μm.

* * * * *